US011666058B2

(12) United States Patent  
Darling et al.

(10) Patent No.: US 11,666,058 B2  
(45) Date of Patent: *Jun. 6, 2023

(54) SYSTEMS AND METHODS FOR CONVEYING, ANESTHETIZING, AND KILLING POULTRY

(71) Applicants: Don Scott Darling, Pender, NE (US); Jonathan Scott Darling, Pender, NE (US)

(72) Inventors: Don Scott Darling, Pender, NE (US); Jonathan Scott Darling, Pender, NE (US)

(73) Assignee: Naturally Recycled Proteins, LLC, Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,837

(22) Filed: Jun. 19, 2020

(65) Prior Publication Data

US 2020/0315190 A1 Oct. 8, 2020

Related U.S. Application Data

(63) Continuation of application No. 16/002,527, filed on Jun. 7, 2018, now Pat. No. 10,694,757, which is a continuation of application No. 14/701,139, filed on Apr. 30, 2015, now Pat. No. 10,015,973, which is a continuation-in-part of application No. 13/969,687, filed on Aug. 19, 2013, now Pat. No. 9,192,170.

(51) Int. Cl.
*A22B 1/00* (2006.01)
*A22B 3/00* (2006.01)
*A22B 3/08* (2006.01)
*A22B 7/00* (2006.01)

(52) U.S. Cl.
CPC ............... *A22B 1/00* (2013.01); *A22B 3/005* (2013.01); *A22B 3/086* (2013.01); *A22B 7/001* (2013.01)

(58) Field of Classification Search
CPC .. A22B 5/00; A22B 7/00; A22B 7/001; A22B 3/005; A22B 3/086
USPC .................................. 452/52–54, 57, 66, 67
See application file for complete search history.

(56) References Cited

U.S. PATENT DOCUMENTS 4,301,770 A * 11/1981 Parker, Jr. ............ A01K 45/005
452/53
5,129,857 A * 7/1992 Keiter ................... A01K 45/005
452/53

(Continued)

*Primary Examiner* — Richard T Price, Jr.
(74) *Attorney, Agent, or Firm* — BrownWinick Law Firm; David M. Breiner

(57) ABSTRACT

In accordance with example embodiments, a system may include a supply unit, a first transfer unit, a second transfer unit, and a gas chamber. In example embodiments, the supply unit may include a plurality of compartments and each compartment may have a moving device configured to move contents of the compartment from a first end of the compartment to a second end of the compartment. In example embodiments the first transfer unit may include a second moving device. In example embodiments, the second transfer unit may include a third moving device. In example embodiments the first transfer unit may be configured to receive contents from each compartment of the supply unit and move the contents to the second transfer unit, and the third moving device may be configured to move the contents to the gas chamber.

10 Claims, 24 Drawing Sheets

(56) References Cited

U.S. PATENT DOCUMENTS

| | | | | |
|---|---|---|---|---|
| 5,913,286 A | * | 6/1999 | Showalter | A01K 45/005 |
| | | | | 119/843 |
| 5,975,029 A | * | 11/1999 | Morimoto | A01K 45/005 |
| | | | | 452/53 |
| 6,109,215 A | * | 8/2000 | Jerome | A01K 45/005 |
| | | | | 119/845 |

* cited by examiner

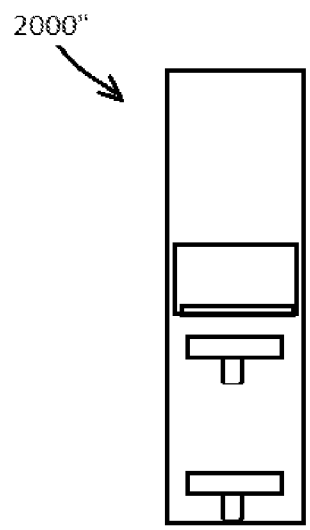

SYSTEMS AND METHODS FOR CONVEYING, ANESTHETIZING, AND KILLING POULTRY

CROSS-REFERENCE TO RELATED APPLICATIONS

This application is a continuation of U.S. patent application Ser. No. 16/002,527 which was filed with the United States Patent and Trademark Office on Jun. 7, 2018 which in turn is a continuation of U.S. patent application Ser. No. 14/701,139 which was filed with the United States Patent and Trademark Office on Apr. 30, 2015, which is a continuation-in-part (CIP) of U.S. application Ser. No. 13/969,687 which was filed with the United States Patent and Trademark Office (USPTO) on Aug. 19, 2013, the entire contents of each of which are herein incorporated by reference.

BACKGROUND

1. Field

Example embodiments relate to systems and methods that may be used to convey, anesthetize, and kill poultry.

2. Description of the Related Art

In recent years there has been an increasing focus on the ethical treatment of animals during a slaughtering process. For many animals, electric shocks are used to anaesthetize the animals before slaughter to ensure the animals feel no pain during the slaughtering process. In the case of poultry, preparation for electric shocks may be stressful. For example, some traditional methods of electrocuting poultry include shackling a bird's feet with metal shackles and suspending the bird by the shackles with the head down. The anaesthetization process itself takes place by passing the animal through a salt bath where an electric current passes from the salt bath, through the bird's head and body, and to the shackles. The animals often remain shackled for several minutes prior to electrocution. While this process generally leaves the animals anaesthetized before slaughter, the anaesthetizing process may cause great stress to the bird.

Other attempts at stunning animals before slaughter include lowering the animals in a pit filled with carbon dioxide. U.S. Pat. No. 7,331,848, for example, discloses the use of a pit filled with a stunning gas (carbon dioxide) with varying gas concentrations. However, this system includes a relatively complicated belt system to transport poultry through the pit which is undesirable.

SUMMARY

The inventor has set out to design an apparatus and method for euthanizing an animal with an eye towards reducing stress on the animal before it is slaughtered. The inventors have also set out to design a reliable and simple system for accomplishing the above goals. In example embodiments, the method is illustrated as being usable for slaughtering poultry. The inventive concepts, however, are not intended to be limited to killing poultry as the inventive concepts may be used to anaesthetize many types of animals.

In accordance with example embodiments, a system may include a supply unit, a first transfer unit, a second transfer unit, and a gas chamber. In example embodiments, the supply unit may include a plurality of compartments and each compartment may have a moving device configured to move contents of the compartment from a first end of the compartment to a second end of the compartment. In example embodiments the first transfer unit may include a second moving device. In example embodiments, the second transfer unit may include a third moving device. In example embodiments the first transfer unit may be configured to receive contents from each compartment of the supply unit and move the contents to the second transfer unit, and the third moving device may be configured to move the contents to the gas chamber.

In accordance with example embodiments, a method may include the operations of aligning a receiving end of a first transfer unit with a first compartment of a supply unit, operating a first moving device in the first compartment to move a first plurality of articles in the first compartment to the first transfer unit, operating a second moving device to move the first plurality of articles to a third transfer device, operating a third moving device in the second transfer device to move the first plurality of articles to a gas chamber, gassing the first plurality of articles, and aligning the receiving end of the first transfer unit with a second compartment of the supply unit.

BRIEF DESCRIPTION OF THE DRAWINGS

Example embodiments are described in detail below with reference to the attached drawing figures, wherein:

FIGS. 12A-12D are views of a first transfer unit in accordance with example embodiments;

DETAILED DESCRIPTION

Figure 1:
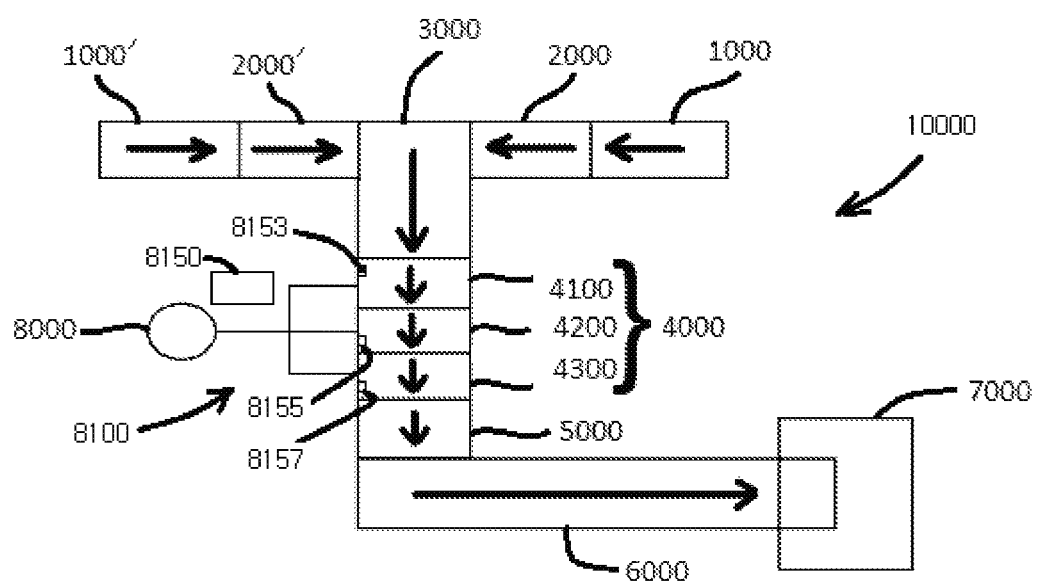
FIG. 1 is a view of a system in accordance with example embodiments.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to systems and methods that may be used to convey, anesthetize, and kill poultry.

FIG. 1 is a view of a system 10000 in accordance with example embodiments. As shown in FIG. 1, the system 10000 may include at least one supply unit 1000, a first transfer unit 2000, a second transfer unit 3000, a gas chamber 4000, a third transfer unit 5000, a fourth transfer unit 6000, and a finishing unit 7000. In example embodiments, the system 10000 may further include a gas source 8000 and a gas delivery system 8100 configured to supply gas from the gas source 8000 to the gas chamber 4000. In example embodiments, an article, for example, a hen, enclosed by the supply unit 1000 may be transferred around the system 10000 via the various transfer units and may be gassed by the gas chamber 4000.

Figure 2A:
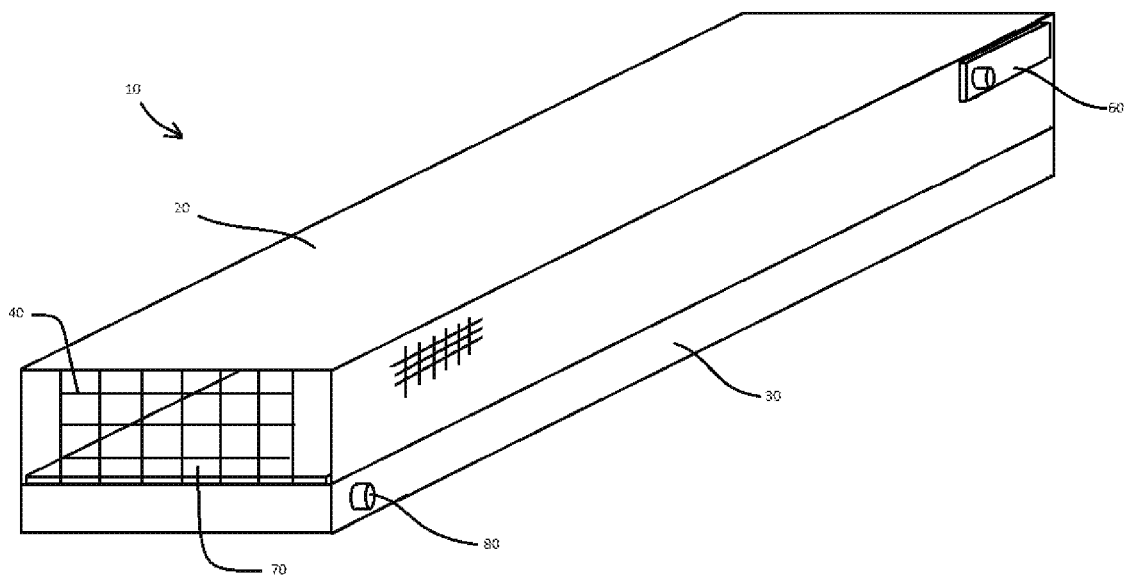
FIGS. 2A-2C are views of a compartment in accordance with example embodiments.
Figure 2B:
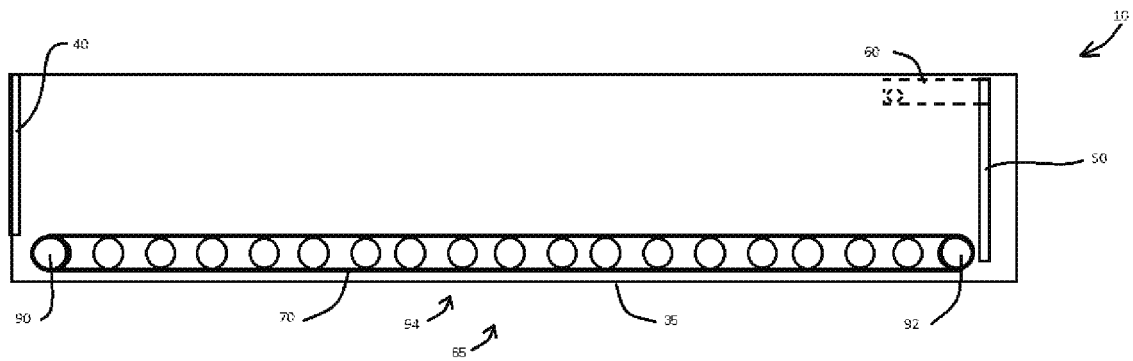
Figure 2C:
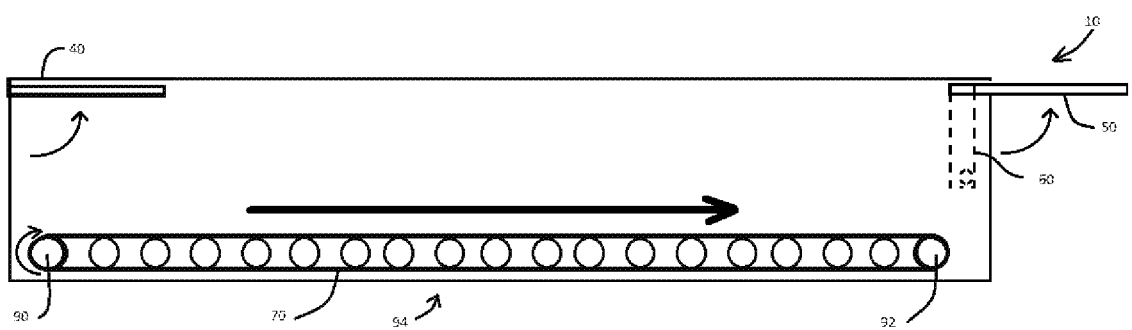

In example embodiments, the supply unit 1000 may be configured to store an article, for example, a hen, or a plurality of articles, for example, a plurality of hens. In example embodiments, the supply unit 1000 may resemble a structure having a plurality of vertically stacked compartments 10 which may each be configured to store a plurality of articles, for example, a plurality of hens. FIGS. 2A-2C are various views of a compartment 10 in accordance with example embodiments. As shown in FIG. 2A, the compartment 10 may resemble a tube shaped structure having top 20, two side walls 30, and a bottom 35. As shown in FIG. 2A, the tube shaped body may have a substantially rectangular cross section, however, this is not intended to be a limiting feature of example embodiments since the body may have another cross section such as, but not limited to, a triangular or square cross section. In example embodiments, ends of the compartment 10 may include doors and thus may allow for an article, for example, a hen, to be inserted easily into the compartment 10. For example, in example embodiments, the compartment 10 may have a first door 40 arranged at a first end of the compartment 10 and a second door 50 arranged at a second end of the compartment 10.

In example embodiments, the compartment 10 may have a handle 60 arranged on an outside of the compartment 10. In example embodiments, the handle 60 may be configured to rotate the second door 50. As shown in FIG. 2B, the door 50 may be in a closed position when the handle is in a first position. However, when the handle 60 is rotated to a second position, as shown in FIG. 2C, the second door 50 may be rotated thus exposing an inside of the compartment 10. Accordingly, in example embodiments, articles may be placed into or taken out of the compartment 10 after an operator operates the handle 60 to move the second door 50 to the second position.

In example embodiments, the first door 40 and the second door 50 may be configured so the first door 40 may swing into the compartment 10 and the second door 50 may swing out of the compartment 10. This, however, is not intended to be a limiting feature of example embodiments since each of the first and second doors 40 and 50 may be configured to swing into, or out of, the compartment 10.

In example embodiments, the compartment 10 may enclose, either completely or partially, a moving device 65 configured to move contents of the compartment 10 from the first end of the compartment 10 to the second end of the compartment 10. In example embodiments, the moving device 65 may resemble a belt roller system having a driving roller 90 and a driven roller 92. In example embodiments, the driving roller 90 may be configured to rotate a belt 70 around the driving roller 90 and the driven roller 92. The belt roller system may further include a plurality of intermediate rollers 94 which may be configured to support the belt 70. The belt roller system may comprise the driving roller 90 proximal to the first end of the compartment 10 and another driving roller 90 proximal the second end of the compartment 10, thereby allowing operation of the belt roller system from either end. In example embodiments, however, the intermediate rollers 94 may be replaced by a plate (or a pair of plates) which may be configured to function as a support floor for the belt 70 or perhaps the rollers 94 are not replaced by any support. For example, the driving roller 90, the driven roller 92 and the belt 70 may be part of a slider belt assembly. Thus, the intermediate rollers 94 may be omitted.

In example embodiments, the driving roller 90 or the driving rollers 90 may be connected, either directly or indirectly, to an attachment 80 which may be exposed outside of the compartment 10. For example, in example embodiments the driving roller 90 may be attached directly to the attachment 80, for example, by welding, or by intermediate structures such as, but not limited to, pins, nuts and bolts. In addition, a gear box or a gear system may be placed between the driving roller 90 and the attachment 80 so that the driving roller 90 may rotate at a different angular velocity than the attachment 80. Regardless as to how the driving roller 90 is attached to the attachment 80, the driving roller 90 may be configured to rotate as the attachment 80 is rotated. Thus, in example embodiments, the driving roller 90 is operatively connected to the attachment 80.

In example embodiments, the attachment 80 may be configured to attach to a driving unit (for example, a hand held electric drill) configured to rotate the attachment 80 thus causing the driving roller 92 to rotate and move the belt 70. As shown in FIG. 2C, the belt 70 may be operated so that contents in the compartment 10 are moved to the second end of the compartment 10. The driving roller 92 may include, in lieu of an attachment 80, an interfacing structure, for example, a depression, configured to receive a bit from the driving unit. Thus, the driving roller 92 may include the attachment 80 (which may be an example of a male interfacing structure) or a depression or a cavity (an example of a female interfacing structure) for receiving the driving unit.

Thus far, in example embodiments, articles, for example, hens, may be placed in the compartment 10 by rotating the doors 40 and/or 50 and the articles may be retained in the compartment 10 by closing the doors 40 and 50 as shown in at least FIG. 2B. In example embodiments, the articles may be removed from the compartment 10 by turning the handle 60 to open the second door 50 and then rotating the driving roller 90 by attaching a driving unit to the attachment 80 and operating the driving unit. Operation of the driving unit causes the driving roller 90 to turn which in turn causes the belt 70 to move which in turn causes contents of the compartment 10 to move to the second end of the compartment 10. In example embodiments, the first door 40 may be associated with a loading end of the compartment 10 and the second door 50 may be associated with an unloading end of the compartment 10.

In example embodiments, the side walls 30 of the compartment 10 may be provided with apertures or meshing to allow the compartment 10 to be well ventilated. Proper ventilation may help reduce stress on any articles, for example, hens, that may be present in the compartment. In addition, a size of the compartment may be configured to allow for multiple articles, for example, multiple hens, to be stored therein. For example, the compartment 10 may be configured to fit several articles, for example, about five to six hens, therein Example embodiments, however, are not limited thereto as the compartment 10 may be configured to house less than five articles or more than six articles. For example, the compartment 10 may be configured to house ten to thirty hen.

Figure 2D:
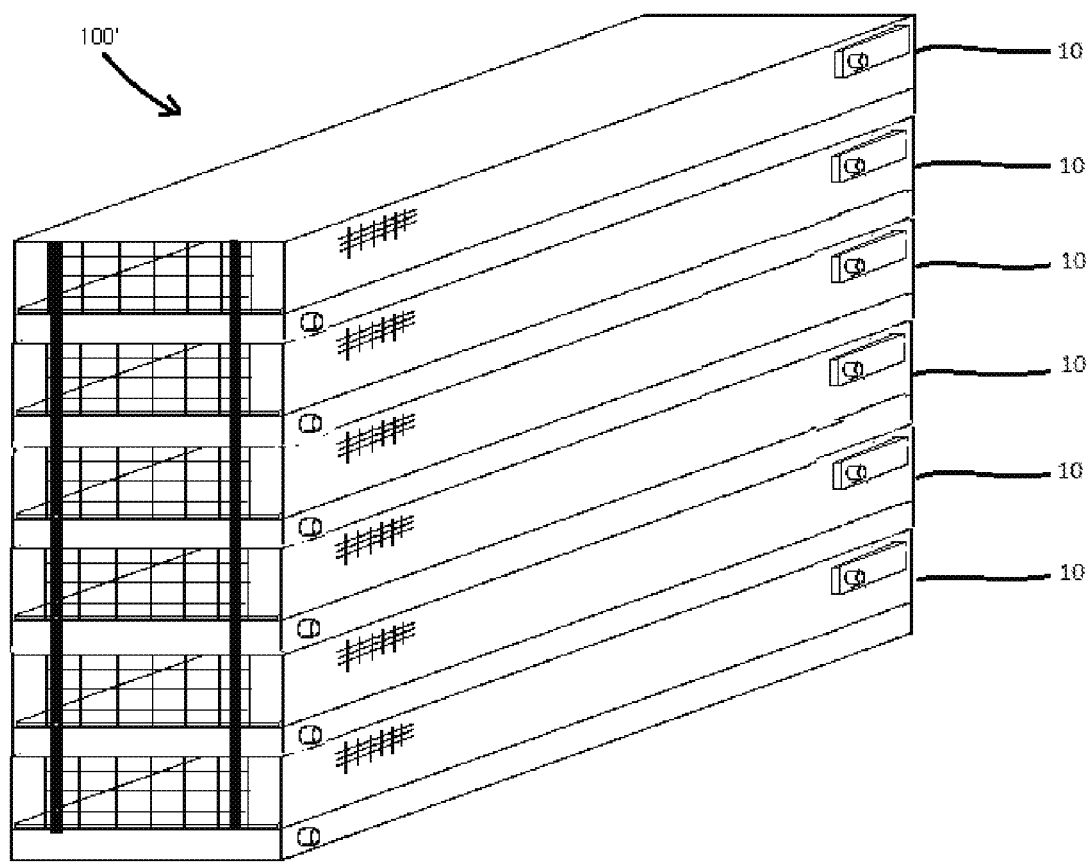
FIG. 2D is a view of a composite structure in accordance with example embodiments.

FIG. 2D illustrates a plurality of compartments 10 stacked vertically on top of one another to form a composite structure 100'. In example embodiments, the composite structure 100' may be formed by fabricating each compartment 10 separately and then stacking one on top of the other. This, however, is not intended to be a limiting feature of example embodiments. For example, a composite structure 100' may be formed by arranging various sheets, bars, tubes, and rollers system to arrive at a structure which has substantially the same characteristics as the composite structure 100' formed by stacking together pre-formed compartments 10. This latter method may have certain advantages over the first method. For example, in the first method, each of the prefabricated compartments may be made with a top 20 and a bottom 35. The top 20 and bottom 35 may provide for separation between adjacent compartments, however, in example embodiments, the tops 20 and bottoms 35 may not be required since the moving devices of each compartment may provide for separation between compartments built by the second method. Thus, the latter method may be less expensive than stacking together prefabricated compartments 10 since the latter method may not require as many elements as the first method. Although example embodiments illustrate the composite structure is assembled by vertically stacking the compartments 10, example embodiments are not limited thereto. For example, the compartments 10 may be arranged side-by-side as well as being vertically stacked.

Figure 2E:
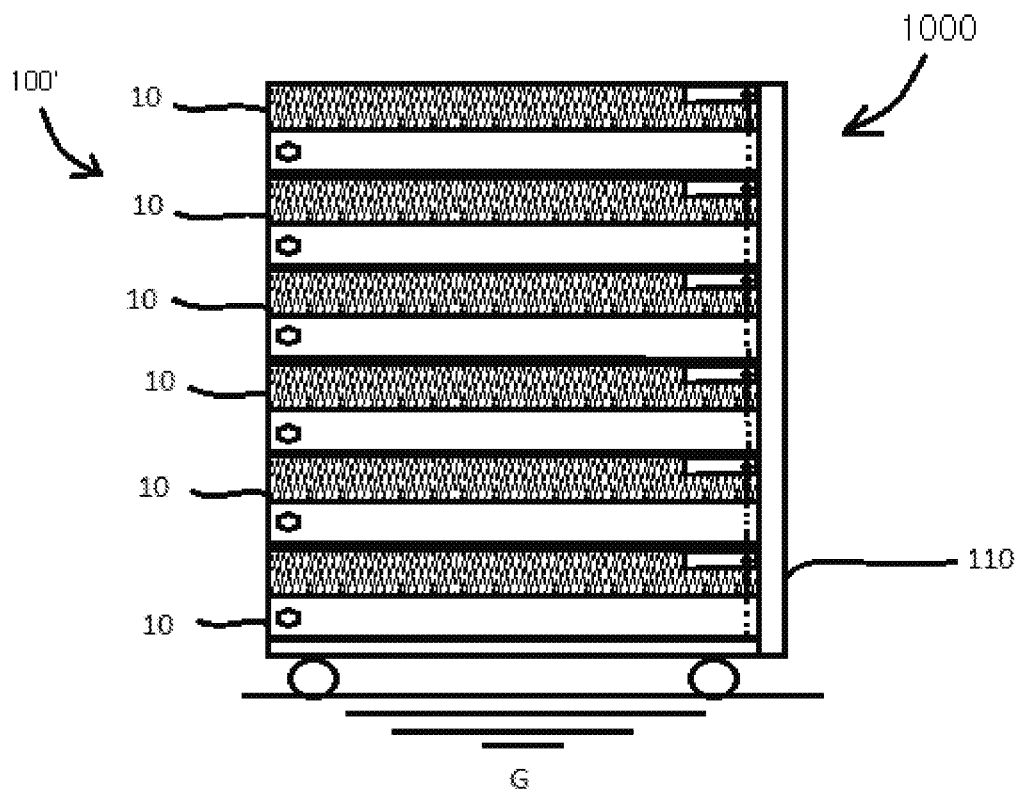
FIGS. 2E and 2F are views of a supply unit in accordance with example embodiments.
Figure 2F:
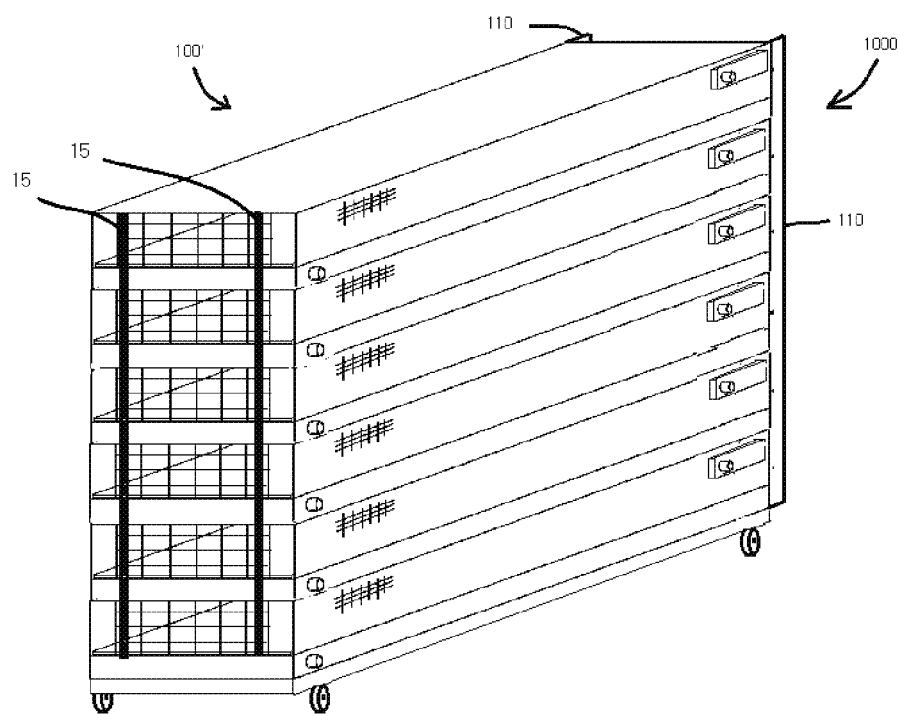

FIGS. 2E and 2F illustrate an example of a supply unit 1000 in accordance with example embodiments. In this nonlimiting example embodiment, the supply unit 1000 may be comprised of the multicompartment composite structure 100'. Although this example embodiment illustrates the supply unit 1000 as being comprised of six compartments 10, the invention is not limited thereto as the supply unit 1000 may include more or less than six compartments. In example embodiments, each of the compartments may be substantially similar or identical to the previously described compartments in that each compartment of the supply unit 1000 may include a moving device configured to move contents of the compartments from a first end thereof to a second end thereof. In example embodiments, the supply unit 1000 may further include a pair of retaining bars 110. As will be explained shortly, the retaining bars 110 may be configured to secure the supply unit 1000 to the first transfer unit 2000. In example embodiments, the retaining bars 110 may resemble a pair of parallel bars spaced far enough apart to allow the second doors 50 to rotate between them. In addition to the above, the supply unit 1000 may include fittings such as wheels or rollers to allow the supply unit

1000 to be easily moved across the ground G or a floor. For example, the supply unit 1000 may include a pair of castor wheels arranged near the unloading end of the supply unit 1000. The supply unit 1000 may be further modified with additional retaining bars 15 which may, for example, prevent the first doors 40 of the compartments from swinging outward of the supply unit 1000 while allowing the doors 40 to swing inwards.

Figure 2G:
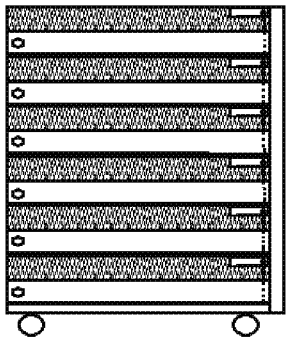
FIGS. 2G-2M are views illustrating opening and closing of various doors of the supply unit in accordance with example embodiments.
Figure 2H:
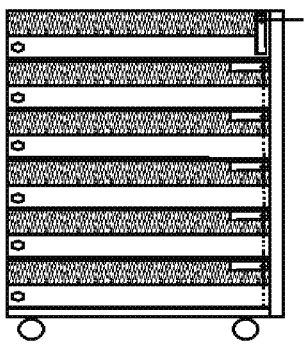
Figure 2I:
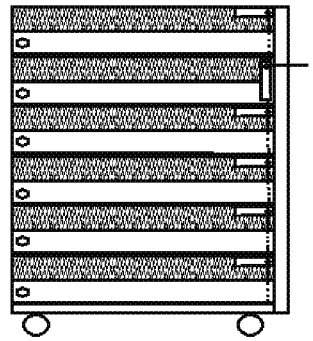
Figure 2J:
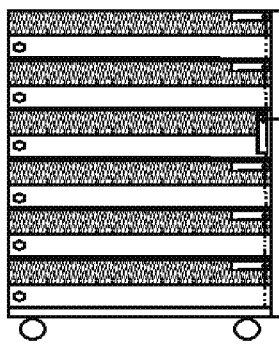
Figure 2K:
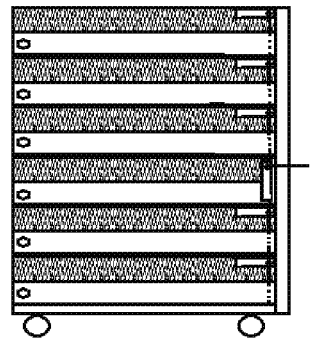
Figure 2L:
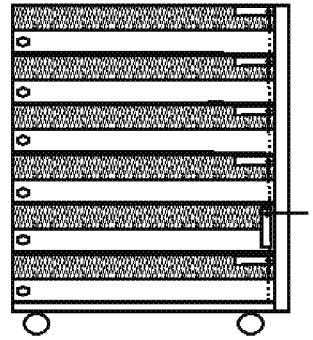
Figure 2M:
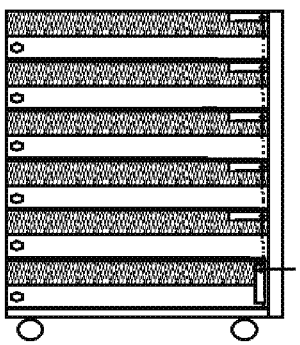

FIG. 2G illustrates the supply unit 1000 with each door of each compartment closed. FIG. 2H illustrates the supply unit 1000 having the second door of the top compartment open so contents of the top compartment may be moved out of the top compartment by activating the top compartment's moving device. FIGS. 2H-2M illustrates the other compartment's doors being opened so articles stored therein may be moved out by operating their respective moving devices. In example embodiments, each compartment may be emptied out one at a time by operating their respective handles and moving devices as shown in the figures.

Figure 3A:
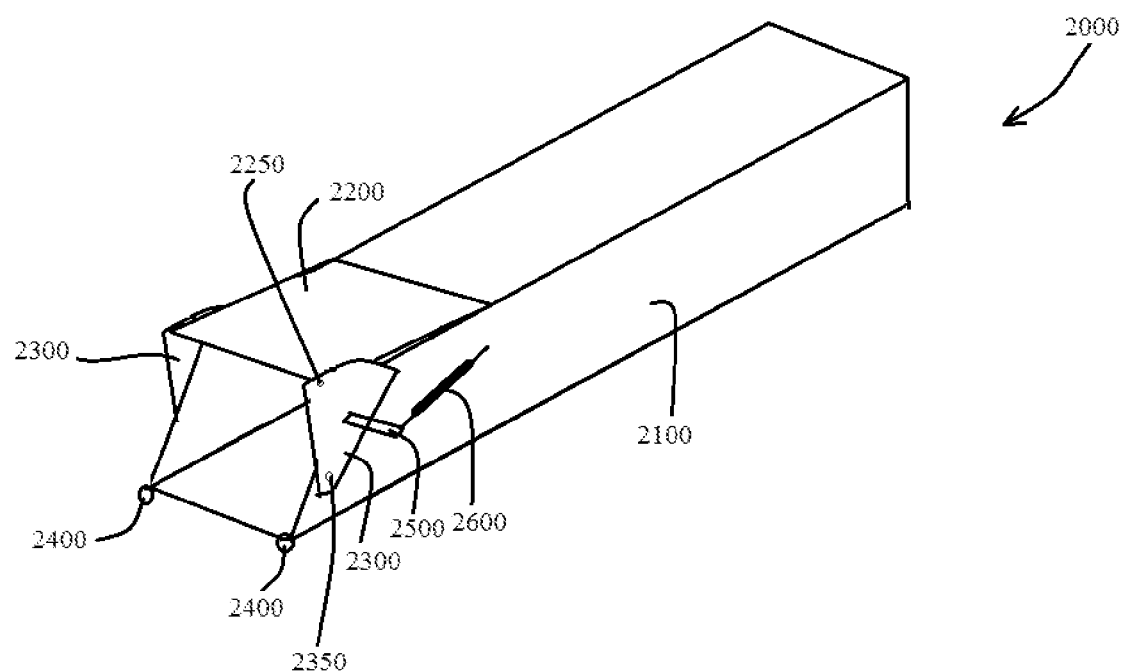
FIGS. 3A-3D are views of a first transfer unit in accordance with example embodiments.

FIG. 3A is a perspective view of the first transfer unit 2000 in accordance with example embodiments. As shown in FIG. 3A, the first transfer unit 2000 may have a tube shaped body 2100 which may have a substantially rectangular cross-section. Example embodiments, however, are not limited thereto as the first transfer unit 2000 may have a body 2100 with a different cross-section, for example, a square, triangular, or circular cross-section.

Referring again to FIG. 3A, the first transfer unit 2000 may have a pair of side plates 2300 pin-connected to the body 2100 by a pair of fastening members 2350 (only one of which is illustrated in the drawings) such as, but not limited to, a pair of pins, a pair of rivets, or a pair of bolts. In example embodiments, the pair of side plates 2300 may also be pin-connected to a cover plate 2200 by a pair of fastening members 2250 (only one of which is shown in the figures) such as, but not limited to, a pair of pins, a pair of rivets, or a pair of bolts. In example embodiments, the cover plate 2200 may be configured to slide along a top of the body 2100 to cover a portion of the body 2100. In example embodiments, the side plates 2300 may be biased into a home position by a biasing member 2600 which may attach to the side plate 2300 by a connecting bar 2500. In example embodiments, the first transfer unit 2000 may further include a pair of connecting rings 2400. In example embodiments, the connecting rings 2400 may be arranged adjacent to the pair of retaining bars 110 that may be on the supply unit 1000. Thus, in example embodiments, a pin passing through the pair of retaining bars 110 and the connecting rings 2400 may couple the supply unit 1000 to the first transfer unit 2000.

Figure 3B:
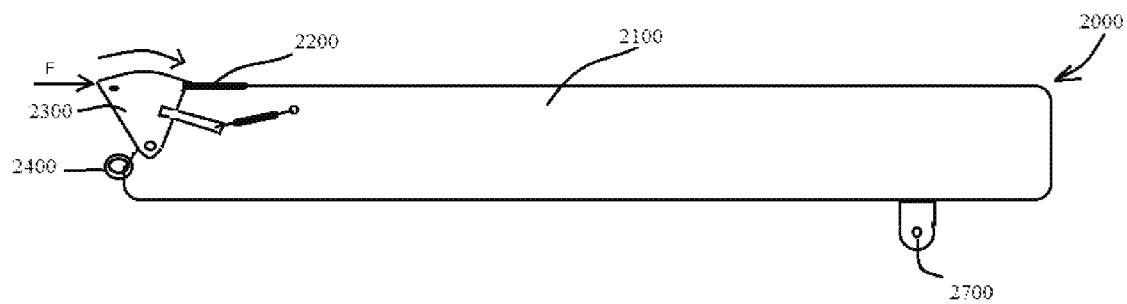
Figure 3C:
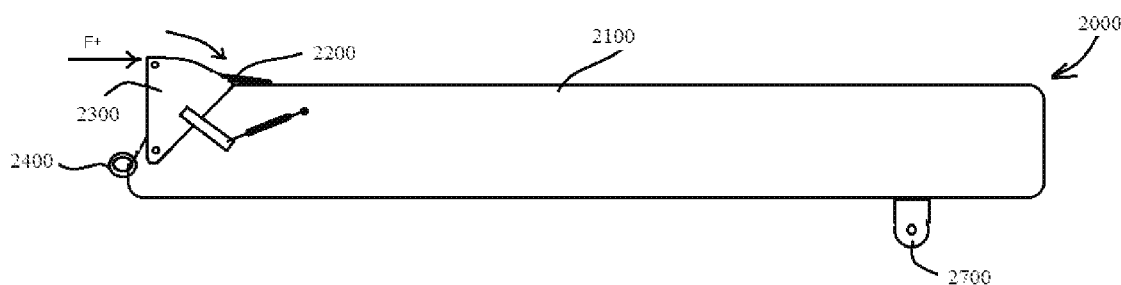
Figure 3D:
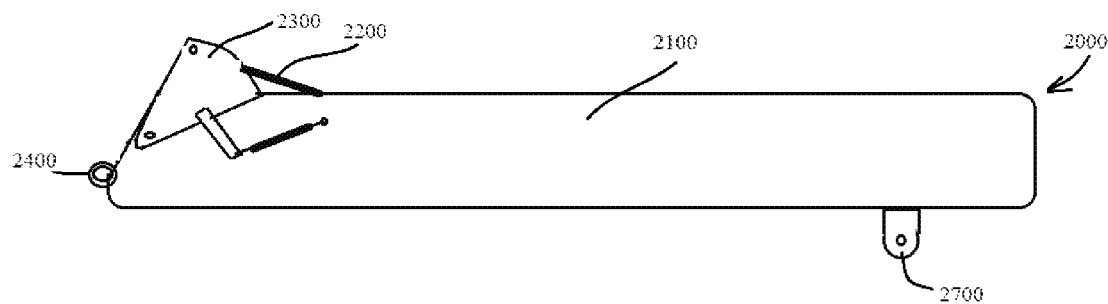

FIGS. 3B-3D illustrate side views of the first transfer unit 2000. In FIG. 3B, the biasing member 2600 may bias the side plates 2300 (and therefore the cover plate 2200) in a first position (also called a "home" position). However, because the cover plates 2300 are pin connected to the body 2100, a force F applied to the cover plates 2300 may rotate the side plates 2300 backward as shown in FIG. 3C. Application of additional force F+ may cause the side plates 2300 to move back even further as shown in FIG. 3D. However, in the event the force is reduced or removed, the side plates 2300 would move back to their original position under the influence of the biasing member 2600. In example embodiments, the biasing member 2600 may be, but is not limited to, a spring. In example embodiments, the first transfer unit 2000 may further include a bracket 2700 which may allow the first transfer unit 2000 to attach to a supporting structure.

Figure 3E:
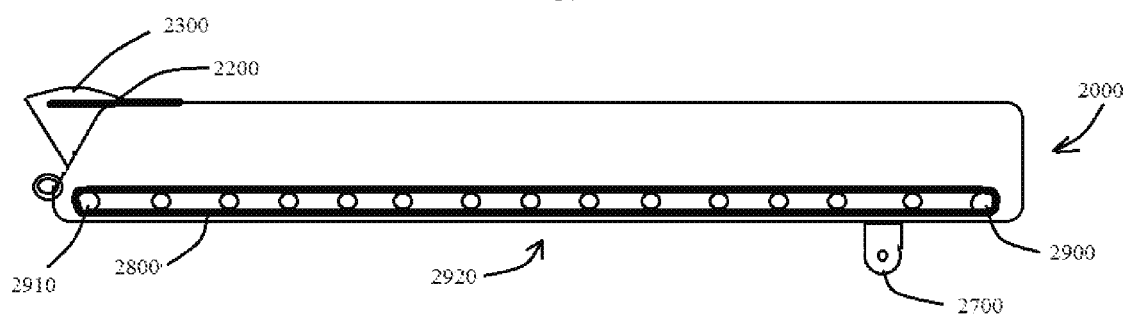
FIGS. 3E-3G are partial views of the first transfer unit in accordance with example embodiments.
Figure 3F:
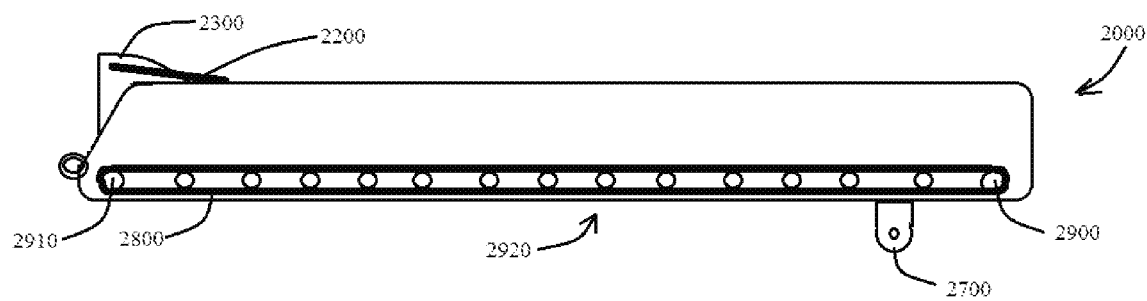
Figure 3G:
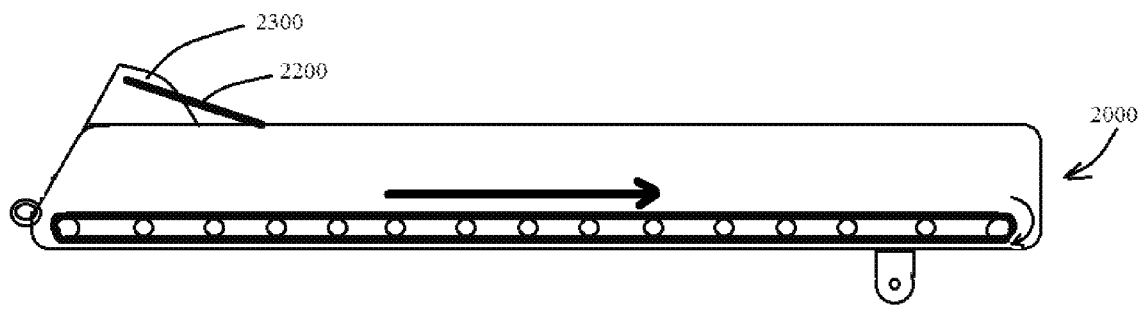
Figure 4:
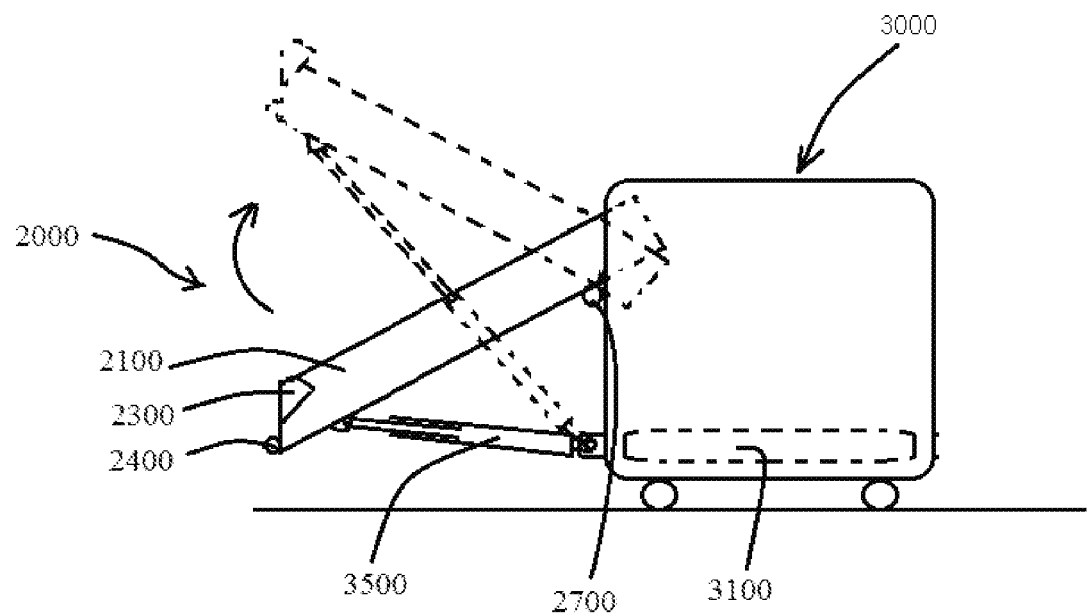
FIG. 4 is a view of the first transfer unit connected to a second transfer unit in accordance with example embodiments.

FIGS. 3E-3G illustrate side views of the first transfer unit 2000 with various elements removed to expose an inside thereof. As shown in FIGS. 3E-3G, the first transfer unit 2000 further includes a moving device 2920 that may be configured to move an article along the body 2100 of the first transfer unit 2000. In example embodiments, the moving device 2920 may include a driving roller 2900 or more than one driving roller 20—spaced apart, a driven roller 2910, and, optionally, a plurality of intermediate rollers between the driving roller 2900 and the driven roller 2910 (noting the driven roller 2910 is arranged at the receiving end of the first transfer unit 2000). In example embodiments, the moving device 2920 may further include a belt 2800 which may be moved by rotation of the driving roller 2900. As in the previous example, the intermediate rollers may not be necessary in example embodiments since the intermediate rollers may be replaced by plates, for example, metal plates. In example embodiments, the driving roller 2900 may be attached to a motor (not shown) or another actuating device (not shown, for example, a belt driven by a motor), however, since such an arrangement is well known in the art, a description thereof is omitted for the sake of brevity FIG. 4 illustrates a view of the first transfer unit 2000 and the second transfer unit 3000 in accordance with example embodiments. As shown in FIG. 4, the second transfer unit 3000 may enclose a third moving device 3100 which, as will be explained later, may be a belt-roller type system. As shown in FIG. 4, the first transfer unit 2000 may be pin-connected to a side of the second transfer unit 3000 via the bracket 2700. In example embodiments, the first transfer unit 2000 may be connected to the second transfer unit 3000 by a structure such as, but not limited to, a bolt or a pin. In addition, an actuator 3500 may also connect the first transfer unit 2000 to the second transfer unit 3000. In example embodiments, the first transfer unit 2000 may be revolved around the bracket 2700 as the actuator 3500 is expanded or retracted. In example embodiments, the actuator 3500 may be, but is not limited to, a hydraulic or pneumatic cylinder.

Figure 5:
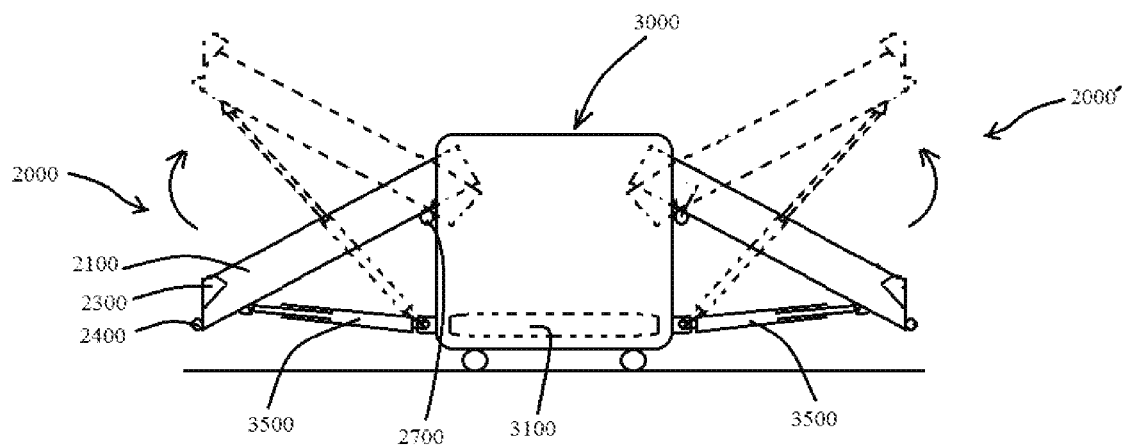
FIG. 5 is a view of two transfer units connected to the second transfer unit in accordance with example embodiments.

FIG. 5 illustrates another transfer unit 2000' attached to a second side of second transfer unit 3000. In example embodiments the transfer unit 2000' may be substantially the same as the first transfer unit 2000, thus, a detailed description thereof is omitted for the sake of brevity.

Figure 6A:
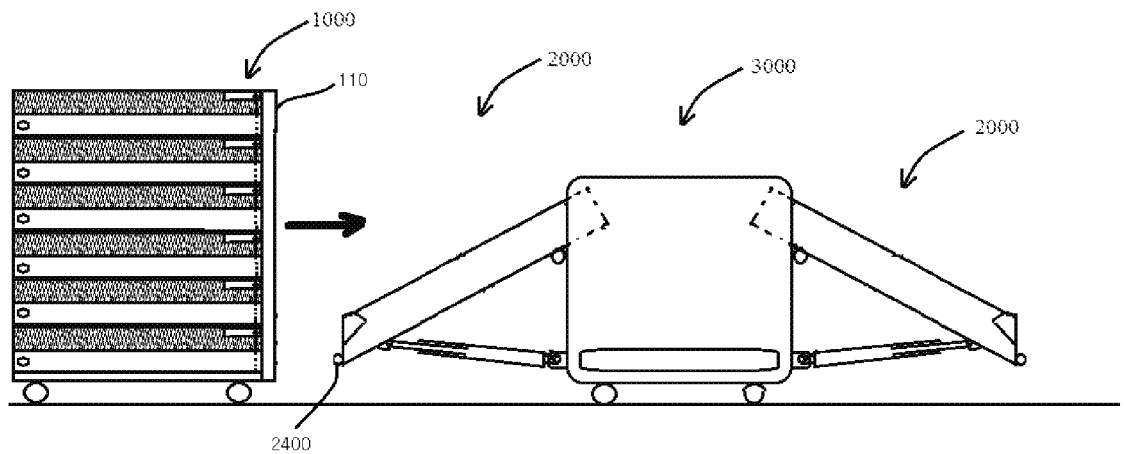
FIGS. 6A-6C are views of the supply unit being connected to the first and second transfer unit and operations thereof in accordance with example embodiments.
Figure 6B:
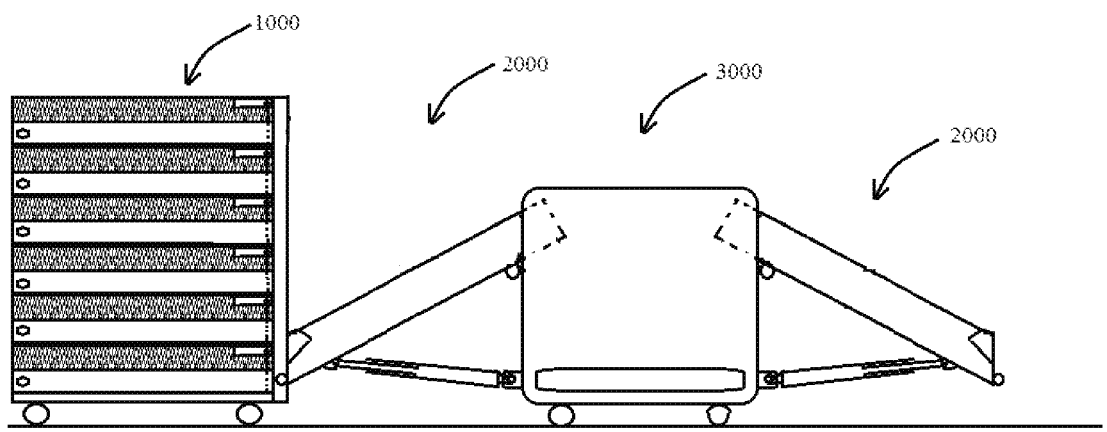
Figure 6C:
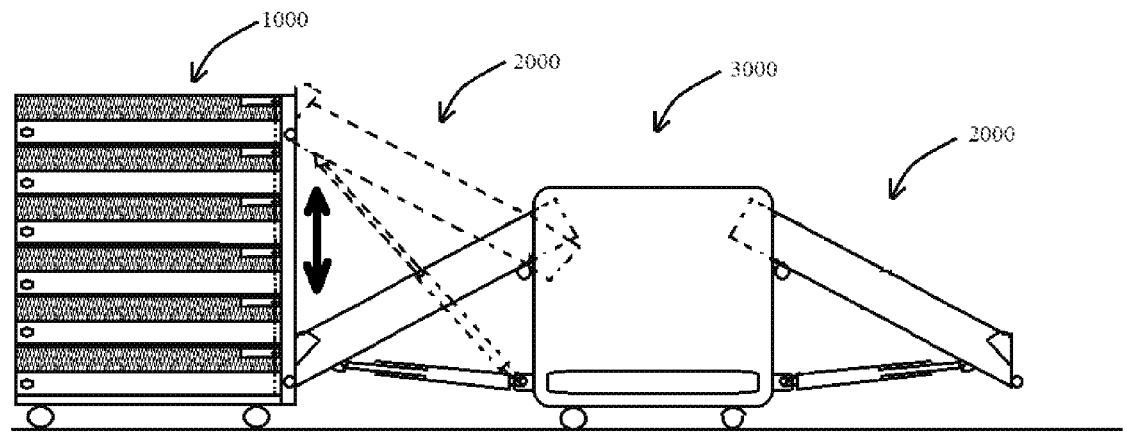

FIG. 6A illustrates the supply unit 1000 arranged next to the first transfer unit 2000. In example embodiments, the supply unit 1000 may be pushed towards the first transfer unit 2000 until holes of the connecting rings 2400 are aligned with a space defined by the retaining bars 110 as shown in FIG. 6B. At this point, a pin may be passed through space defined by the retaining bars 110 and the holes of the connecting rings 2400 in order to slidingly attach the supply unit 1000 to the first transfer unit 2000 as shown in FIG. 6B. Once connected, operation of the actuator 3500 will rotate the first transfer unit 2000 such that a receiving end of the first transfer unit 2000 remains adjacent the second ends of the compartments of the supply unit 1000 as shown in FIG. 6C.

Figure 7A:
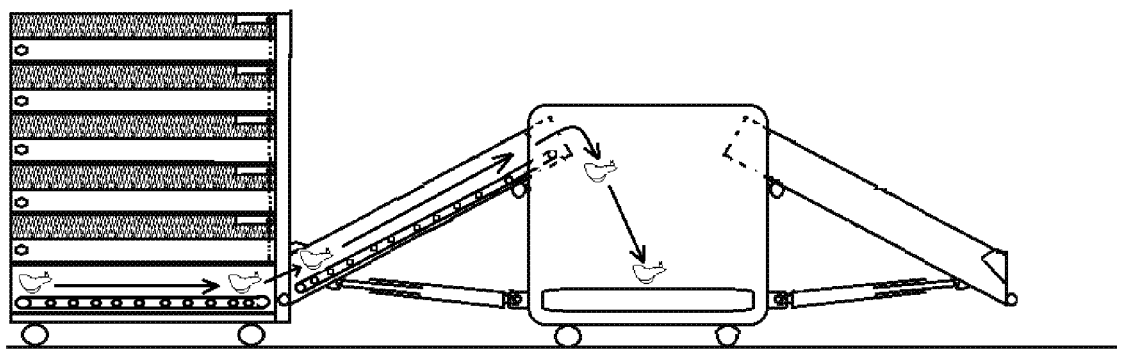
FIGS. 7A-7C illustrate a method of moving an article from the supply unit to the second transfer unit in accordance with example embodiments.
Figure 7B:
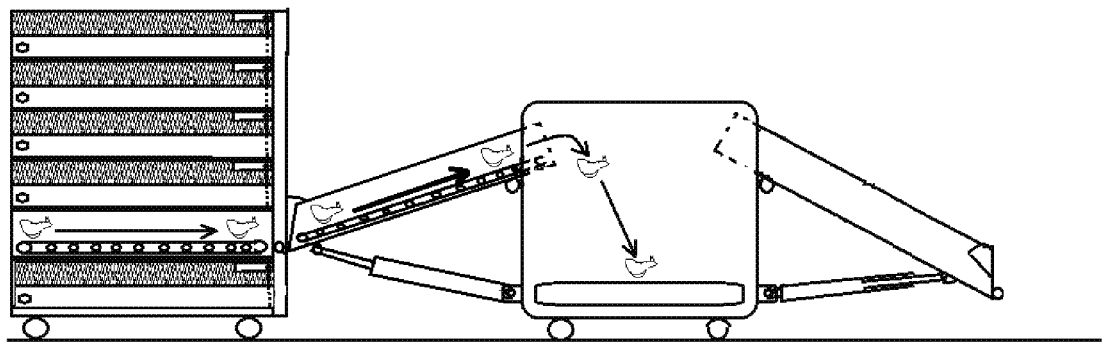
Figure 7C:
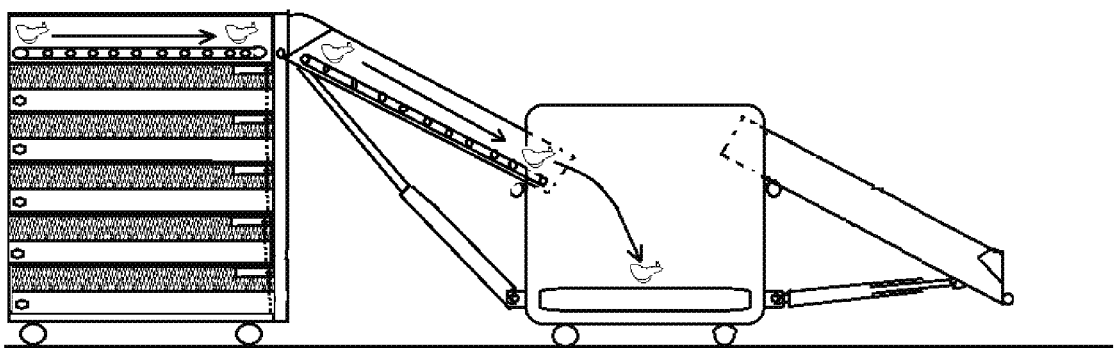

FIGS. 7A-7C illustrate operations of unloading objects from the supply unit 1000 to the second transfer unit 3000 via the first transfer unit 2000. In FIGS. 7A-7C certain portions of the supply unit 1000, the first transfer unit 2000, and the second transfer unit 3000 are removed for purposes of illustration only. As shown in FIG. 7A, a lowermost compartment of the supply unit 1000 may be unloaded by rotating a handle 60 controlling the second door 50 of the lower most compartment. Once the second door of the lowermost compartment is opened, a user may attach a driving unit to the attachment 80 of the lower most compartment in order to energize the moving device 65 of the lower most compartment to move the contents therein to the second end of the lowermost compartment. At this stage, the contents are transferred to the moving device 2920 of the first transfer device 2000 to move the contents along the first transfer device 2000 to the second transfer device 3000 where the contents are carried out of the second transfer device 3000 by the third moving device 3100. In example embodiments, the handle 60 may be rotated backwards to close the second door 50 and the actuator 3500 may be operated to rotate the first transfer device 2000 so that an entrance of the first transfer device 2000 is substantially in line with the second lower most compartment as shown in FIG. 7B. At this point, an operator may open the second door 50 of the second lowermost compartment by rotating the handle 60 of the second lower most compartment. Once the second door of the second lowermost compartment is opened, a user may attach a driving unit to the attachment 80 of the second lower most compartment in order to energize the moving device 65 of the second lower most compartment to move the contents therein to the second end of the second lowermost compartment. At this stage, the contents are transferred to the moving device 2920 of the first transfer unit 2000 to move the contents along the first transfer unit 2000 to the second transfer unit 3000 where the contents are carried out of the second transfer unit 3000 by the third moving device 3100. In example embodiments, the handle 60 of the second lowermost compartment may be rotated backwards to close the second door 50 of the second lower most compartment. This process may be repeated until each of the compartments of the supply unit 1000 are emptied.

Figure 8:
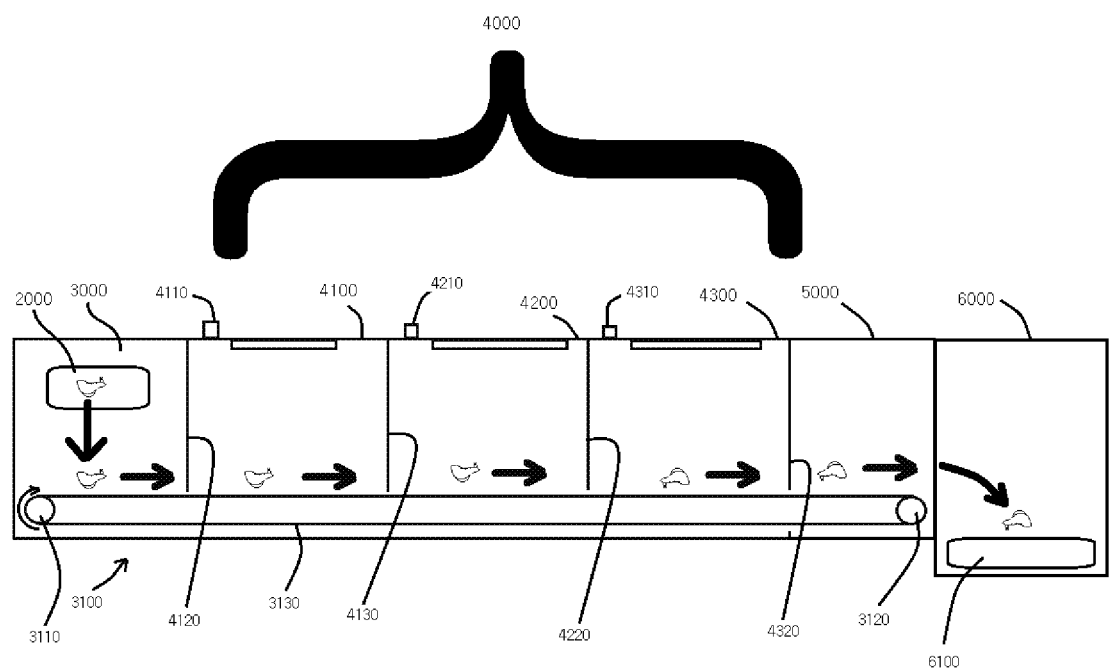
FIG. 8 is a view of the second transfer unit, the third transfer unit, and the gas chamber in accordance with example embodiment.

FIG. 8 is a schematic view of the second transfer unit 3000, the gas chamber 4000, the third transfer unit 5000, and the fourth transfer unit 6000. As shown in at least FIG. 8, the second transfer unit 3000, the gas chamber 4000, and the third transfer unit 5000 may be arranged side-by-side and the moving device 3100 may move articles from the second transfer unit 3000 through the gas chamber 4000 and through the third transfer unit 5000 to the fourth transfer unit 6000. In example embodiments, the moving device 3100 may be a roller belt type system. For example, in example embodiments, the moving device 3100 may include a driving roller 3110 and a driven roller 3120 about which a belt 3130 may be wrapped. In example embodiments, the driving roller 3110 may be attached to a motor which causes the driving roller 3100 to turn thus causing the belt 3130 to move around the driven roller 3120. In example embodiments, articles received by the second transfer unit 3000 from the first transfer unit 2000 may be moved through each of the second transfer unit 3000, the gas chamber 4000, and the third transfer unit 5000 by the third moving device 3100. The invention is not intended to be limited by the instant embodiment. For example, in example embodiments, 3120 may be the driving roller and 3110 may be the driven roller. In the alternative, rather than having one moving device configured to move an article through each of the second transfer unit 3000, the gas chamber 4000, and the third transfer unit 5000, separate moving devices for each of the second transfer unit 3000, the gas chamber 4000, and the third moving device 5000 may be used.

Referring to at least FIG. 8, it is observed the gas chamber 4000 may be comprised of multiple chambers. For example, in FIG. 8 the gas chamber 4000 is illustrated as being comprised of a first chamber 4100, a second chamber 4200, and a third chamber 4300. Although a gas chamber 4000 comprised of three chambers is illustrated in example embodiments, the invention is not limited thereto. For example, in example embodiments, the gas chamber 4000 may be comprised of only a single chamber, two chambers, or more than three chambers.

In example embodiments, partitions may be provided to form the various chambers in the gas chamber. For example, in FIG. 8, a first partition 4120 and a second partition 4130 may define the first chamber 4100, the second partition 4120 and a third partition 4220 may define the second chamber 4200, and the third partition 4220 and a fourth partition 4320 may define the third chamber 4300. In example embodiments, the partitions may be made from a resilient material, for example, a plastic material, or a plurality of plastic materials, that deform to allow the articles to pass through and then return to their undeformed state. In the alternative, the partitions may be made from a canvas type material or strips of canvas to allow the articles to pass therethrough.

In example embodiments, each of the first, second, and third chambers 4100, 4200, and 4300 may include an inlet port through which a gas may be received. For example, in example embodiments, the first chamber 4100 may include a first inlet port 4110, the second chamber 4200 may include a second inlet second port 4210, and the third chamber 4300 may include a third inlet port 4310. In example embodiments, each of the first, second, and third ports 4110, 4210, and 4310 may be configured to receive a gas from the gas source 8000 via the gas delivery system 8100 which may include a controller 8150 configured to control a flow of gas from the gas source 8000 to the first, second, and third chambers 4100, 4200, and 4300. In example embodiments, the chambers 4100, 4200 and 4300 are made water-tight to keep the gas from sinking through any seams or opening in the surface of the chamber. Depending on the depth of the chamber, the upper part of said chamber may not require any sealing since most gases of utility for this invention are heavier than air.

In example embodiments, various sensors may be placed in each of the chambers of the gas chamber 4000. For example, as shown in at least FIG. 9, in example embodiments, the first chamber 4100 may include a first sensor 8153 configured to sense a level of gas, for example, carbon dioxide, in the first chamber 4100, the second chamber 4200 may include a second sensor 8155 configured to sense a level of gas, for example, carbon dioxide, in the second chamber 4200, and the third chamber 4300 may include a third sensor 8157 configured to sense a level of gas, for example, carbon dioxide, in the third chamber 4300. The controller 8150 may interface with each of the sensors 8153, 8155, and 8157 in order to determine the level of gas, for example, carbon dioxide, is in each chamber and to determine how much gas from the gas source 8000 should be added to each chamber. Though not shown in the figures, the sensors 8153, 8155, and 8157 may be connected to the controller 8150 (which may be a computer) either wirelessly or with wires which is well known in the art.

Figure 9:
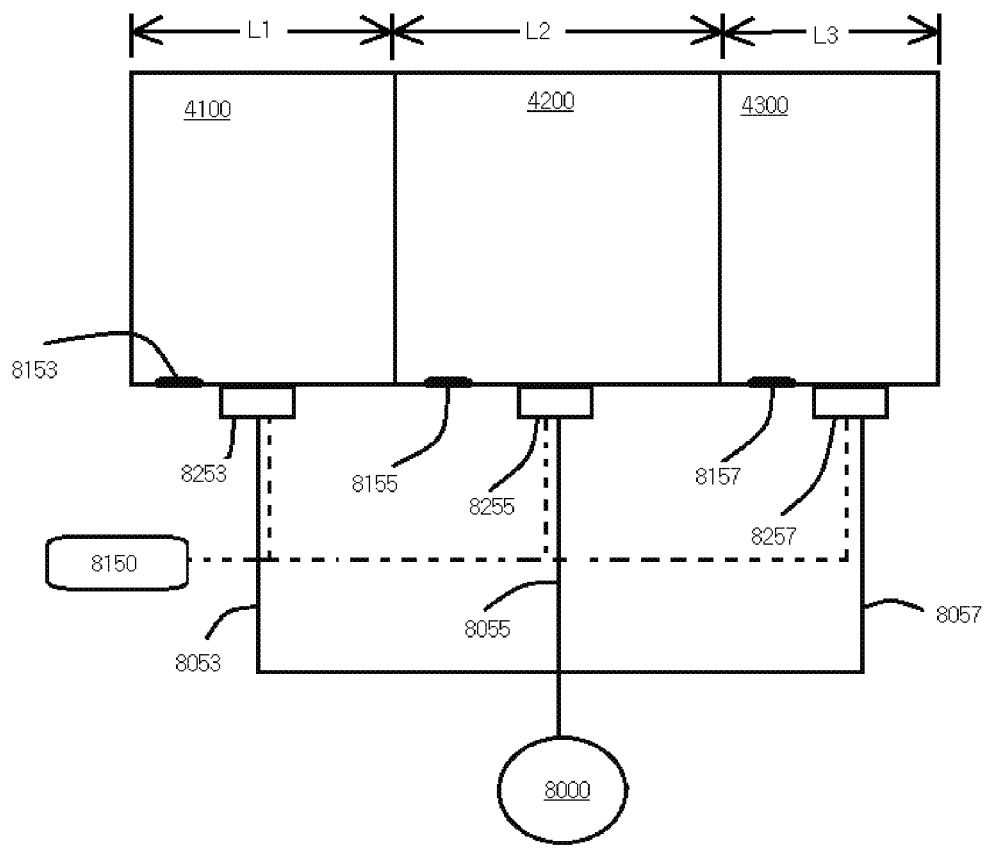
FIG. 9 is a schematic view of a gas chamber, a gas delivery system, and a controller in accordance with example embodiments.

Referring to FIG. 9, it is observed the controller 8150 may also be connected to a plurality of solenoid valves 8253, 8255, and 8257 to control a flow of gas from the gas source 8000 to the first, second, and third chambers 4100, 4200, and 4300. For example, in example embodiments, the gas source 8000 may be connected to the first solenoid valve 8253 by a first hose 8053, the second solenoid valve 8255 by a second hose 8055, and the third solenoid valve 8257 by a third hose 8057. In example embodiments, the first sensor 8153 may detect a concentration of a gas, for example, carbon dioxide, in the first chamber 4100 and the controller 8150 may control the solenoid valve 8253 to open or close based on the concentration of gas detected by the first sensor 8153. In example embodiments, the second sensor 8155 may detect a concentration of a gas, for example, carbon dioxide, in the second chamber 4200 and the controller 8150 may control the solenoid valve 8255 to open or close based on the concentration of gas detected by the second sensor 8155. In example embodiments, the third sensor 8157 may detect a concentration of a gas, for example, carbon dioxide, in the third chamber 4300 and the controller 8150 may control the solenoid valve 8257 to open or close based on the concentration of gas detected by the third sensor 8157.

As noted above, the controller 8150 may be configured to control a flow of gas to each of the chambers 4100, 4200, and 4300 so that a concentration of gas in the chambers resides within a predetermined or preset level. For example, in example embodiments, the gas may be carbon dioxide and the level of carbon dioxide in the first chamber 4100 may be about 20%, the concentration of gas in the second chamber 4200 may be between about 20% and about 30%, and the concentration of gas in the third chamber 4300 may be about 50%. In example embodiments, the inventors found these gas concentrations are particularly useful in stunning and euthanizing poultry. For example, when poultry is exposed to carbon dioxide gas at about 20% the poultry becomes very calm. When the calmed poultry is exposed to carbon dioxide gas from about 20% to about 30% concentration the poultry become anesthetized. When the anesthetized poultry is exposed to carbon dioxide gas at about 50% concentration, the poultry dies. Thus, in example embodiments, the instant apparatus and method allows for a relatively quick and painless death for poultry which is desirable.

Inventors have found that a particularly useful nonlimiting example embodiment of the invention encompasses a gas chamber 4000 wherein each of the chambers 4100, 4200, and 4300 have a length of about four feet. For example, the first chamber 4100 may have a length L1 of about four feet, the second chamber 4200 may have a length L2 of about 4 feet, and the third chamber 4300 may have a length L3 of about four feet. In this particular geometry, the belt speed of the belt 3100 is such that it advances articles, such as poultry, about six feet per minute. Such an exposure has been found useful in calming, anaesthetizing and killing poultry. Example embodiments, however are not limited thereto as the lengths L1, L2, and L3 may be different from each other and the belt speed is not required to be six feet per minute. For example, in the event the gas chamber 4000 were used to kill larger animals, the belt speed may be slowed down and/or the lengths L1, L2, and L3 may be increased.

In example embodiments, after the articles leave the gas chamber 4000 the articles may be transported to the fourth transfer unit 6000 via the third transfer unit 5000. Once in the fourth transfer unit 6000 a moving device 6100 may move the articles to the finishing unit 7000 which may be a device such as, but not limited to, a grinder.

Example embodiments provide an apparatus 10000 and method for transporting and gassing an article. In example embodiments, the article may be a hen or a plurality of hens. Referring back to FIG. 1, the apparatus 10000 may have a substantially T-shape comprised of a first supply unit 1000, a first transfer unit 2000, a second supply unit 1000' (which may be substantially identical to the first supply unit 1000), a second first transfer unit 2000' (which may be substantially identical to the first transfer unit 2000), a second transfer unit 3000 configured to receive articles (for example, hens) from the first transfer unit 2000 and the second first transfer unit 2000', and transport the articles to a gas chamber 4000 for the purpose of gassing the articles. In the event the articles are hens, the hens may be euthanized in a painless and quick manner as described above.

In example embodiments, gas is used to lull, aneathetize, and kill an animal, such as a hen. In example embodiments, carbon dioxide has been used as an example of a gas that may be used for the above purpose. However, the invention is not limited thereto as other gases, such as argon or nitrogen may be used in lieu of carbon dioxide or in addition to carbon dioxide.

In example embodiments, the system 10000 may be used to collect and euthanize animals. For example, a nonlimiting example of using the system may include the steps of: 1) placing hens in the supply unit 1000; 2) moving the supply unit 1000 to the first transfer unit 2000; 3) linking together the supply unit 1000 and the first transfer unit 2000 with a linking member such as, but not limited to, a pin; 3) using a driving unit (for example, a hand held electric drill) to cause various moving systems within the supply unit 1000 to move the hens to the first transfer unit 2000; 4) using the first transfer unit 2000 to transfer the hens to the second transfer unit 3000; 5) using the second transfer unit 3000 to move the hens to a gassing chamber 4000; and 6) gassing the hens to calm, anesthetize, and kill the hens.

Figure 10A:
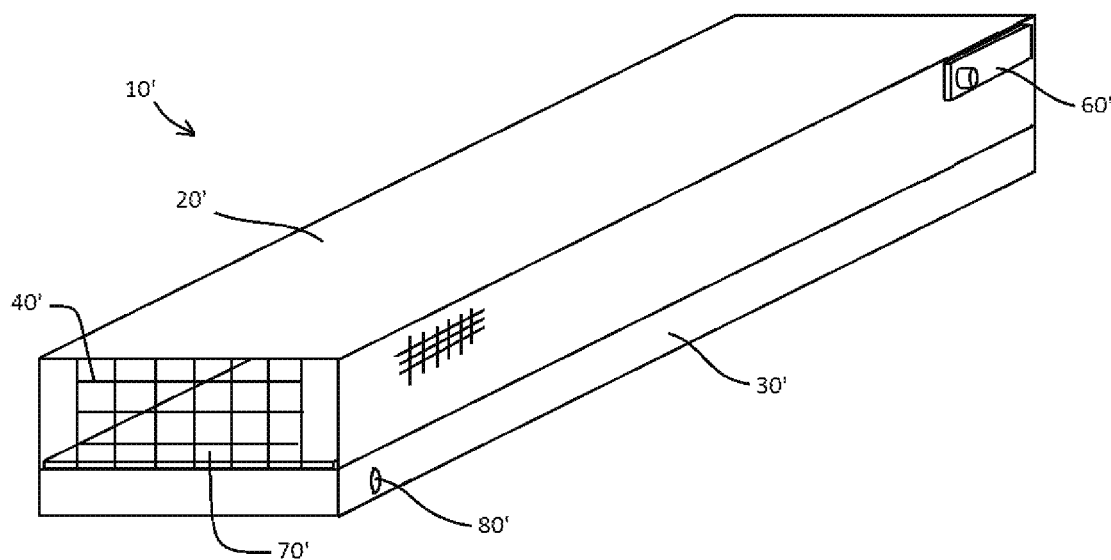
FIGS. 10A-10C are views of a compartment in accordance with example embodiments.
Figure 10B:
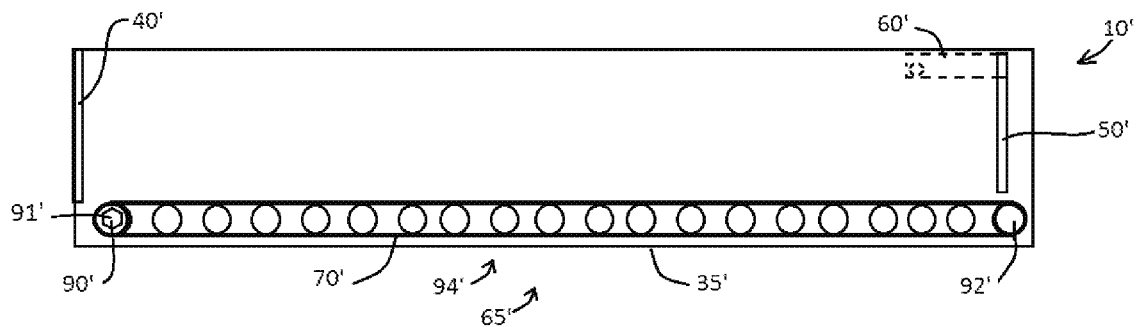
Figure 10C:
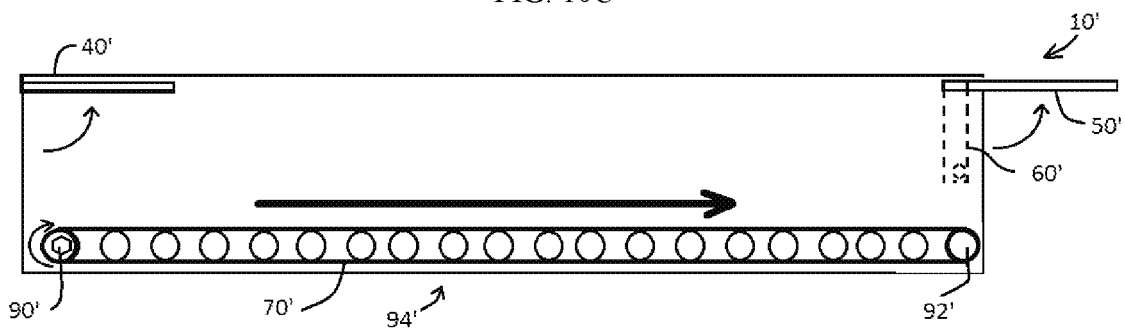

FIG. 10A illustrates another example of a compartment 10' in accordance with example embodiments. FIGS. 10B and 10C illustrate cross-sections of the compartment 10'. In example embodiments, the compartment 10' may be substantially similar to the compartment 10 and thus may be used in lieu of the compartment 10 in constructing the first supply unit 1000. Like the compartment 10, compartment 10' may resemble a tube shaped structure having top 20', two side walls 30', and a bottom 35'. As shown in FIG. 10A, the tube shaped body may have a substantially rectangular cross section, however, this is not intended to be a limiting feature of example embodiments since the body may have another cross section such as, but not limited to, a triangular or square cross section. In example embodiments, ends of the compartment 10' may include doors and thus may allow for an article, for example, a hen, to be inserted easily into the compartment 10'. For example, in example embodiments, the compartment 10' may have a first door 40' arranged at a first end of the compartment 10' and a second door 50' arranged at a second end of the compartment 10'.

In example embodiments, the compartment 10' may have a handle 60' arranged on an outside of the compartment 10'. In example embodiments, the handle 60' may be configured to rotate the second door 50'. As shown in FIG. 10B, the door 50' may be in a closed position when the handle 60' is in a first position. However, when the handle 60' is rotated to a second position, as shown in FIG. 10C, the second door 50' may be rotated thus exposing an inside of the compartment 10'. Accordingly, in example embodiments, articles may be placed into or taken out of the compartment 10' after an operator operates the handle 60' to move the second door 50' to the second position.

In example embodiments, the compartment 10' may enclose, either completely or partially, a moving device 65' configured to move contents of the compartment 10' from the first end of the compartment 10' to the second end of the compartment 10'. In example embodiments, the moving device 65' may resemble a belt roller system having a driving roller 90' and a driven roller 92'. In example embodiments, the driving roller 90' may be configured to rotate a belt 70' around the driving roller 90' and the driven roller 92'. The belt roller system may further include a plurality of intermediate rollers 94' which may be configured to support the belt 70'. In example embodiments, however, the intermediate rollers 94' may be replaced by a plate (or a pair of plates) which may be configured to function as a support floor for the belt 70'. Thus, the intermediate rollers 94' may be omitted.

In example embodiments, the driving roller 90' may include a receiving surface 91' which may be configured to receive a portion of a handheld device, for example, a drill, via a hole 80' that may be formed in the side 30' as illustrated in FIG. 10A. For example, in example embodiments the receiving surface may 91' may resemble a surface associated with a cavity having a hexagonal cross section. In this particular nonlimiting example, a hex key bit connected to a drill may be inserted into the receiving surface 91' so that when the drill is operated the driving roller 90' rotates. As shown in FIG. 10C, the belt 70' may be operated so that contents in the compartment 10' are moved to the second end of the compartment 10'.

Figure 11:
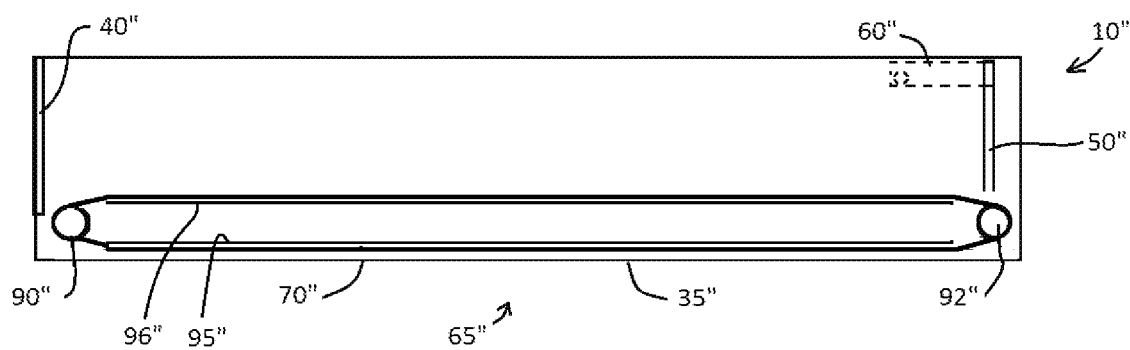
FIG. 11 is a view of a compartment in accordance with example embodiments.

FIG. 11 illustrates another example of a compartment 10" in accordance with example embodiments. Because the compartment 10" may be substantially similar to the compartment 10, the compartment 10" may be used in lieu of compartment 10 to form the first supply unit 1000. Like compartment 10, the compartment 10" includes a first door 40", a second door 50" arranged at ends of a tube shaped body having two sidewalls, a top and a bottom 35". Like the compartment 10, the compartment 10" also includes a moving device 65" having a driving roller 90", a driven roller 92", and a belt 70". In example embodiments, the driving roller 90" may be driven by a hand held device, such as a drill, by way of an attachment or a receiving surface as has been described previously. In the compartment 10" however, there are no intermediate rollers between the driving roller 90" and the driven roller 92". Instead a pair of plates 95" and 96" are provided around which the belt 70" rotates. The top plate 95" may serve as a support floor for articles, for example, hens, that may be in the compartment 10".

Figure 12A:
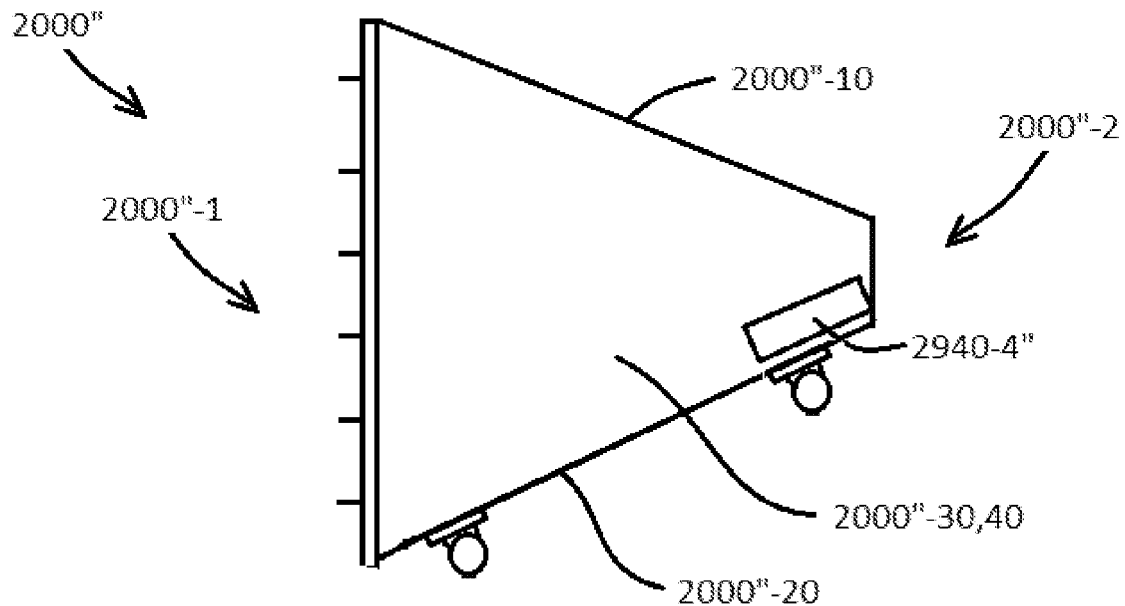
Figure 12B:
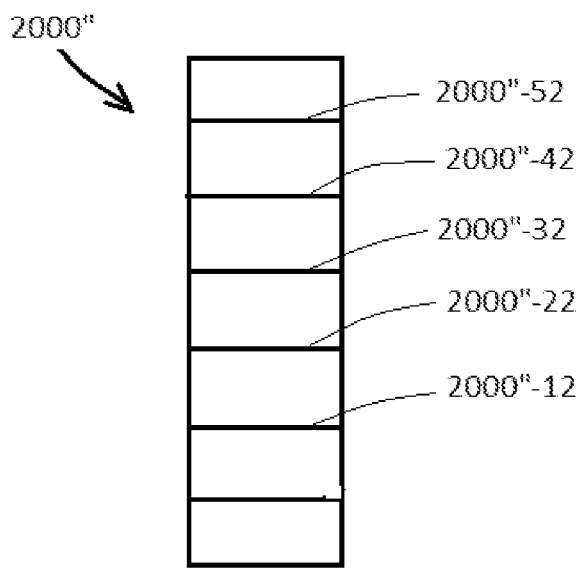

Other modifications of example embodiments are considered to fall within the scope of applicant's invention. For example, FIGS. 3A-3G illustrate an example of a first transfer unit 2000 which may be configured to move articles, for example, hens, from a supply unit 1000 to a second transfer unit 3000. The first transfer unit 2000, as previously explained, may be rotatably attached to the second transfer unit 3000 and an end of the first transfer unit 2000 may be moved from one compartment 10 of the supply unit 1000 to another compartment of the supply unit 1000 by controlling an actuator 3500. However, the invention is not limited thereto. For example, FIGS. 12A-12D illustrate another example of a first transfer unit 2000" where FIG. 12 A is a side view of the first transfer unit 2000", FIG. 12B is a front view of the first transfer unit 2000", FIG. 12C is a back view of the first transfer unit 2000", and FIG. 12D is a section view of the first transfer unit 2000".

Referring to FIGS. 12A-12D, the first transfer unit 2000" may have top 2000"-10, a bottom 2000"-20, and two side walls 2000"-30 and 2000"-40. Each of the top, bottom, and side walls 2000"-10, 2000"-20, 2000"-30, and 2000"-40 may be, but are not required to be constructed from sheet metal. For example, each of the top, bottom, and side walls 2000"-10, 2000"-20, 2000"-30, and 2000"-40 may be constructed from sheet metal having a thickness of $\frac{1}{16}$ of an inch, $\frac{1}{8}$ of an inch, or $\frac{1}{4}$ of an inch. Of course, example embodiments are not limited by the above as one skilled in the art may find a variety of materials and thicknesses suitable for forming the second transfer unit 2000".

In example embodiments, the top, bottom, and side walls 2000"-10, 2000"-20, 2000"-30, and 2000"-40 may be arranged so as to form a substantially hollow member having a rectangular opening at a first end 2000"-1 and a substantially rectangular opening at a second end 2000"-2 of the first transfer unit 2000". These openings may allow articles, for example, hens, to enter into the first transfer unit 2000" and exit the first transfer unit 2000". Although the openings have been described as rectangular the first transfer unit 2000" may be configured differently so that the openings have another shape such as, but not limited to, triangular, circular, elliptical, hexagonal, octagonal, and so on.

In example embodiments, slides 2000"-12, 2000"-22, 2000"-32, 2000"-42, and 2000"-52 may be provided inside the first transfer unit 2000" so that as articles enter into the opening at the first end 2000"-1 of the first transfer unit 2000" the articles may slide down and onto a moving device 2920" without little to no damage. In example embodiments, the moving device 2920" may resemble a belt driven system configured to move the articles from the first end of the transfer unit 2000" to the second end of the transfer unit 2000". For example, in example embodiments the moving device 2920" may include a driving roller 2920-1" and a driven roller 2920-2" about which a belt 2920-3" is wrapped. In this particular nonlimiting example, the driving roller 2920-1" may be driven by a motor 2940-4" which may be mounted on the first the first transfer unit 2000". Thus, in example embodiments, as the motor 2940-4" operates the driving roller 2920-1" turns which actuates the belt 2920-3" which in turn rotates the driven roller 2920-2". Though not shown in the figures it is clear the first transfer unit 2000" may include additional elements, for example, support rollers and/or plates may be between the driving roller 2920-1" and the driven roller 2920-2" to support the belt 2920-3".

Figure 13A:
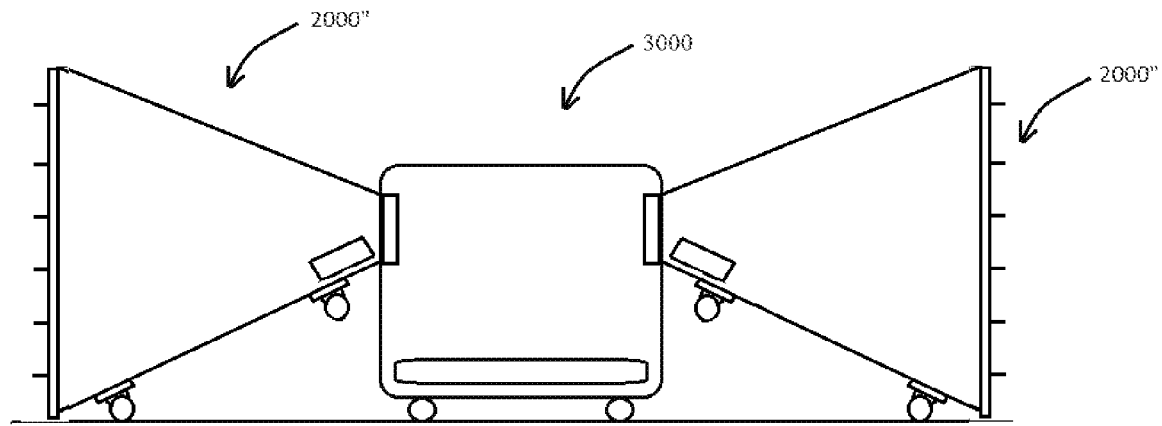
FIGS. 13A-13C are views of the first transfer unit attached to a second transfer unit and supply unit in accordance with example embodiments.
Figure 13B:
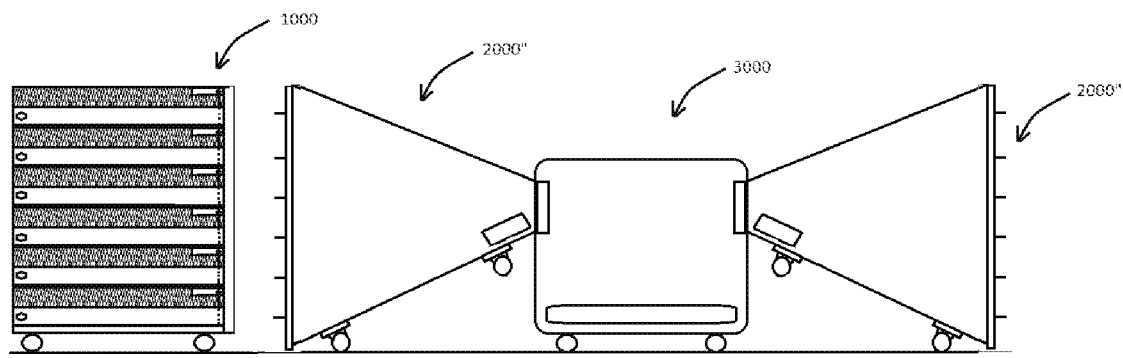
Figure 13C:
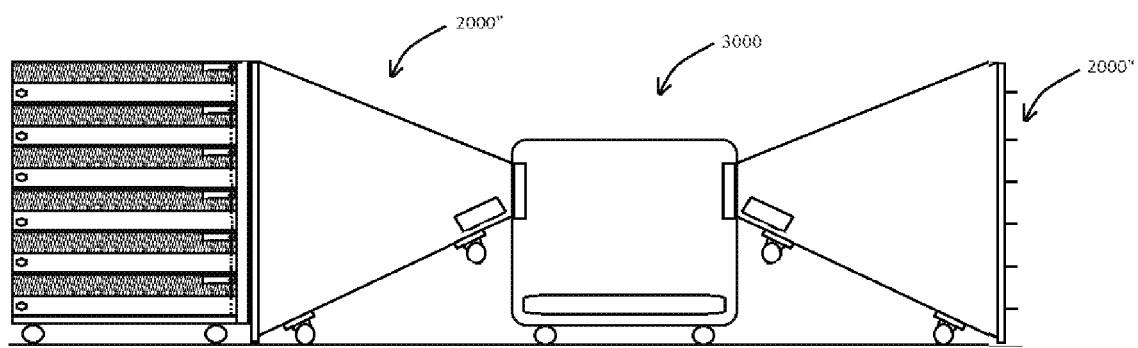

FIGS. 13A, 13B, and 13C illustrate two first transfer units 2000" attached to different sides of a second transfer unit 3000. In example embodiments, the second openings of the first transfer units 2000" are substantially coincident with openings arranged in walls of the second transfer unit 3000 so that articles transferred to the first transfer units 2000" may be transported to an inside of the second transfer unit 3000. FIG. 13B illustrates a supply unit 1000 facing one of the transfer units 2000". In example embodiments, the supply unit 1000 may be pushed to align exits of the individual compartments 10 of the supply unit 1000 with the first opening of one of the first transfer units 2000" as shown in FIG. 13C. In one embodiment bottoms of several of the compartments 10 may be substantially in line with ends of the slides 2000"-12, 2000"-22, 2000"-32, 2000"-42, and 2000"-52 provided inside the first transfer unit 2000" so that at least some of the articles in the supply unit may transfer from the compartments 10 onto the slides 2000"-12, 2000"-22, 2000"-32, 2000"-42, and 2000"-52 before falling onto the moving device 2920" of the first transfer unit 2000". When this happens, articles may slide down and onto a moving device moving device 2920" without harm to the articles.

Figure 14A:
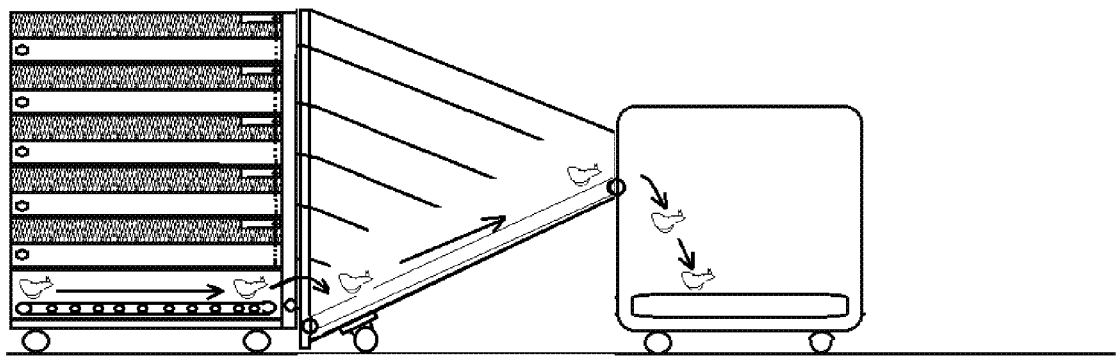
FIGS. 14A-14C are views of the first transfer unit transporting an article in accordance with example embodiments.
Figure 14B:
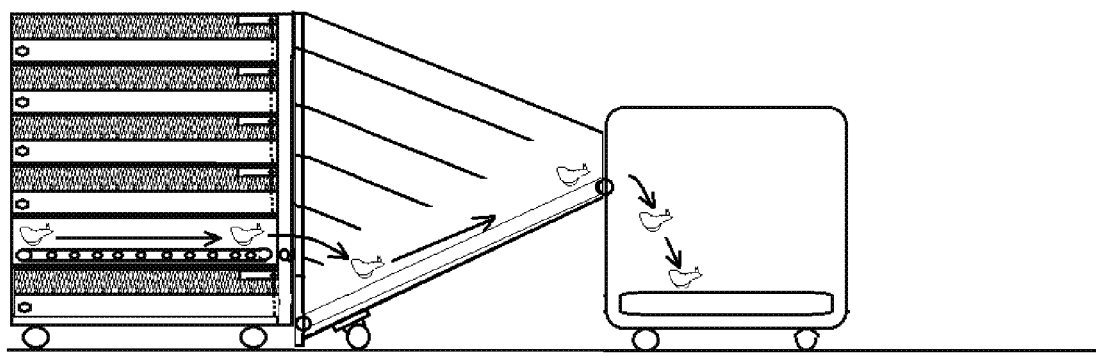
Figure 14C:
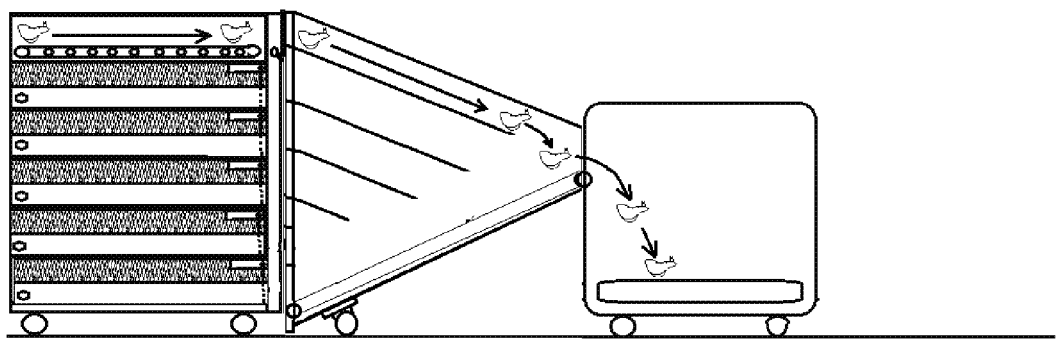

FIGS. 14A-14C illustrate operations of unloading objects from the supply unit 1000 to the second transfer unit 3000 via the first transfer unit 2000". In FIGS. 14A-14C certain portions of the supply unit 1000, the first transfer unit 2000", and the second transfer unit 3000 are removed for purposes of illustration only.

As shown in FIG. 14A, a lowermost compartment of the supply unit 1000 may be unloaded by rotating a handle 60 controlling the second door 50 of the lower most compartment. Once the second door 50 of the lowermost compartment is opened, a user may attach a driving unit to the attachment 80 of the lower most compartment in order to energize the moving device 65 of the lower most compartment to move the contents therein to the second end of the lowermost compartment. At this stage, the contents are transferred to the moving device 2920" of the first transfer device 2000" to move the contents along the first transfer device 2000" to the second transfer device 3000 where the contents are carried out of the second transfer device 3000 by the third moving device 3100. In example embodiments, the handle 60 may be rotated backwards to close the second door 50. As shown in FIG. 14B, an operator may open the second door 50 of the second lowermost compartment by rotating the handle 60 of the second lower most compartment. Once the second door of the second lowermost compartment is opened, a user may attach a driving unit to the attachment 80 of the second lower most compartment in order to energize the moving device 65 of the second lower most compartment to move the contents therein to the second end of the second lowermost compartment. The contents may leave the second end of the second lowermost compartment and into the first transfer device 2000" where they slide along the first slide 2000"-12 and then to the moving device 2920". At this stage, the contents may move along the first transfer unit 2000" to the second transfer unit 3000 where the contents are carried out of the second transfer unit 3000 by the third moving device 3100. In example embodiments, the handle 60 of the second lowermost compartment may be rotated backwards to close the second door 50 of the second lower most compartment. This process may be repeated until each of the compartments of the supply unit 1000 are emptied.

Although the first transfer unit 2000" is illustrated as having five (5) slides, this is not intended to be a limiting feature of example embodiments. For example, in example embodiments the first slide 2000"-12 may be omitted as the drop from the second lower most compartment of the supply unit 1000 may not be very far from the first moving device 2920." Furthermore, in other embodiments, any one of the second, third, fourth, and fifth slides may be removed as in other embodiments the slides may not be necessary. Also in other embodiments, for example, where the supply unit 1000 has more than six compartments, the first transfer unit 2000" may have more than six slides.

Figure 15A:
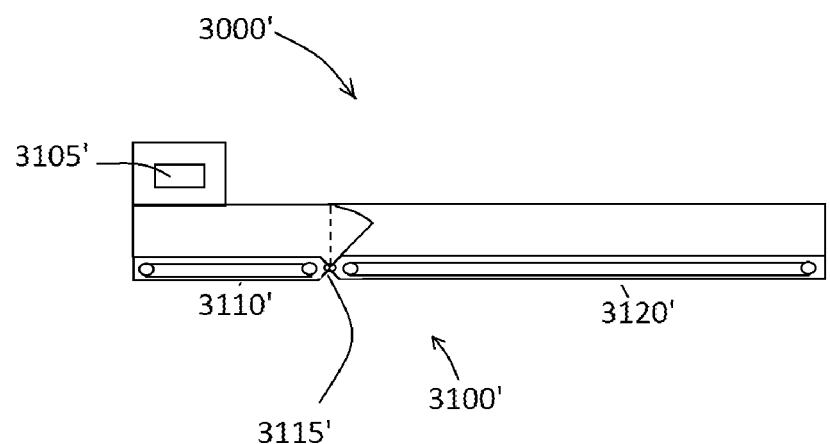
FIGS. 15A-15C are views of a second transfer unit in accordance with example embodiments.
Figure 15B:
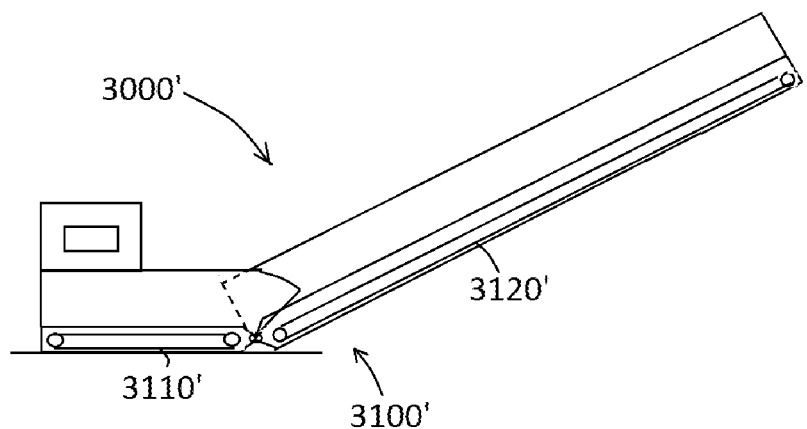

FIGS. 15A and 15B are section views of a second transfer unit 3000' in accordance with example embodiments. In example embodiments the second transfer unit 3000' may be similar to the second transfer unit 3000. For example, the second transfer unit 3000' may include one or more apertures 3150' which may receive articles, for example, hens, from at least one first transfer unit 2000 or at least one the first transfer unit 2000".

In example embodiments, the second transfer unit 3000' may include a hinged body have a first section 3110' and a second section 3120'. The first and second sections 3110' and 3120' may resemble closed tubular members formed from sheet metal, however, the invention is not limited thereto as the first and second sections 3110' and 3120' may be made from another type of material. Furthermore, the first and sections 3110' and 3120' may not be entirely closed as various aperatures may be provided therein to allow for ventilation. In addition, while aperatures may be present, the apertures may not be so large as to allow certain articles, for example, hens, to escape from either of the first and second sections 3110' and 3120'.

In example embodiments, the first section 3110' and the second section 3120' may be held together by a pin 3115'. Because the first section 3110' and the second section 3120' may be pinned together, the second section 3120' may rotate relative to the first section 3110' as shown in FIG. 15B. The instant features, however, are not intended to limit the invention since the first section 3110' and the second section 3120' may not be pinned together as they may be connected to one another by another means such as, but not limited to, welding or clipping.

In example embodiments, the first section 3110' may house a moving device. In example embodiments the moving device of the first section 3110' may resemble a belt wrapped around a driven roller and a driving roller. Similarly, the second section may also house a moving device which may resemble a belt wrapped around a driven roller and a driving roller. Because such moving devices, and variations thereof, have been described, a detailed explanation thereof is omitted for the sake of brevity. In example embodiments, the driving rollers of the first and second sections 3110' and 3120' may be driven by a motor, for example, an electric motor, not shown.

Figure 15C:
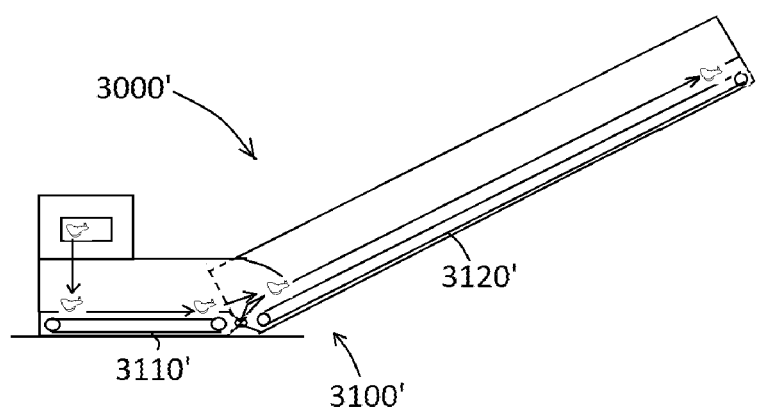

FIG. 15C illustrates an example of the operation of the second transfer unit 3000' in accordance with example embodiments. As shown in FIG. 15C, an article, for example, a hen, received via either the first transfer unit 2000 or the second transfer unit 2000" may be received by the second transfer unit 3000' via the opening 3105'. The article may be moved by the moving device of the first section 3110' to the moving device of the second section 3120' where it is moved to an end of the second section 3120'.

Figure 16:
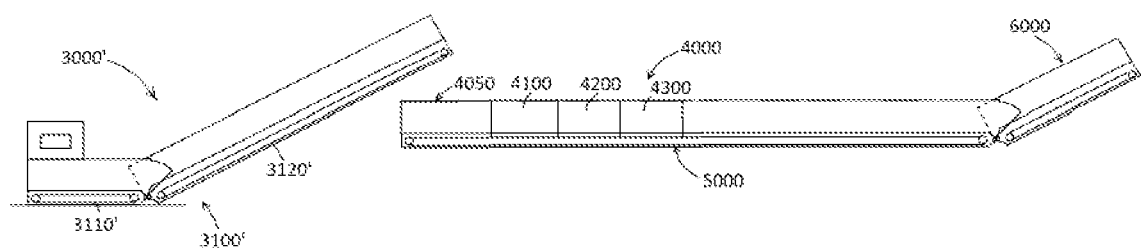
FIG. 16 is a view of a system in accordance with example embodiments.

FIG. 16 illustrates an example of a system 10000' in accordance with example embodiments. In example embodiments the system 10000' may be substantially identical to the system 10000. For example, the system 10000' may include a first transfer unit 2000, 2000' which may be configured to receive articles from a supply unit 1000 and transfer the articles to the second transfer unit 3000'. The second transfer unit 3000' may move the articles to a gas chamber 4000 with three chambers 4100, 4200, 4300 which may operate in a manner and be controlled as previously described. The articles may enter the gas chamber 4000 via an opening which may be arranged at a top thereof. A fourth transfer unit 5000 may move the articles from the gas chamber 4000 to a fourth transfer unit 6000 which may include a moving device as previously described and the fourth transfer unit 6000 may transfer the articles to a finishing unit 7000, which, in this example, may be a grinding apparatus.

Figure 17A:
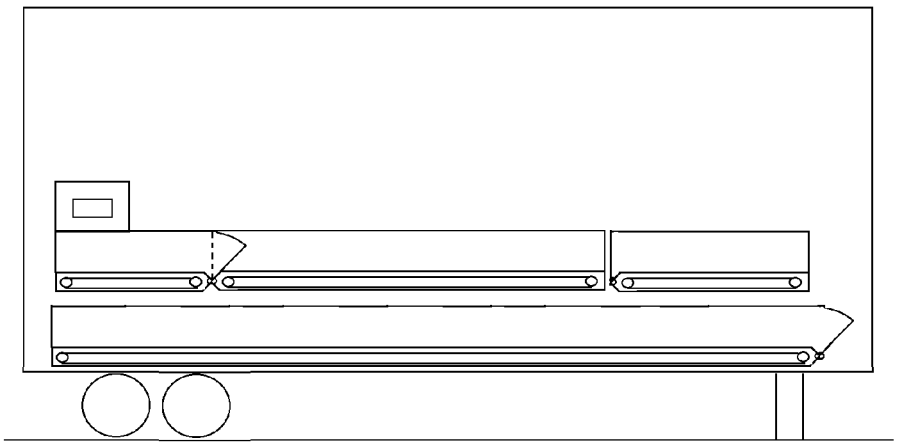
FIGS. 17A-17C are views of a system in accordance with example embodiments.
Figure 17B:
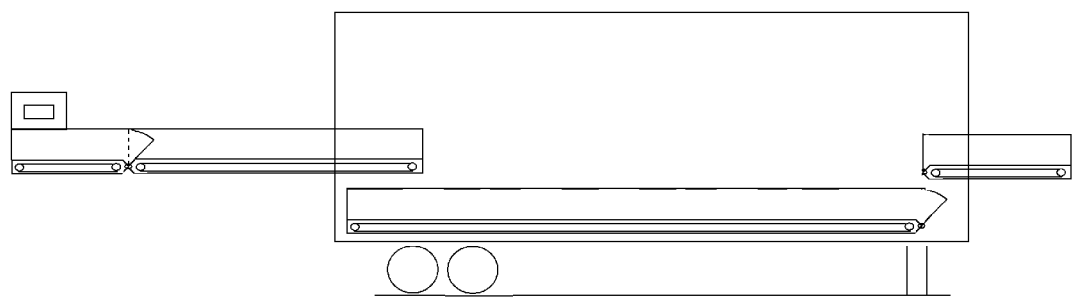

In one nonlimiting example embodiment, each of the supply units 1000, the first transfer units 2000 and 2000", the second transfer units 3000 and 3000', the third transfer units 5000, and the fourth transfer units 6000 may be configured so as to be contained in a standard tractor trailer. For example, as shown in FIG. 17A, the second transfer unit 2000' and the fourth transfer unit 6000 may be configured to stack on top of the gas chamber 4000 and the third transfer unit 5000. Each of these units may, for example, only have a width of about twelve (12) inches to thirty six (36) inches and may be stacked near a middle of the trailer. In this configuration there may be relatively significant space leftover to store the first transfer units 2000 and 2000" along with the supply units 1000. Thus, in example embodiments, the system 10000' may be a mobile system which may be easily transferred from one site to another. FIG. 17B illustrates the second transfer unit 3000' being pulled out of a back of the trailer and the fourth transfer unit 6000 being pushed out an aperture that may be at the front of the trailer.

Figure 17C:
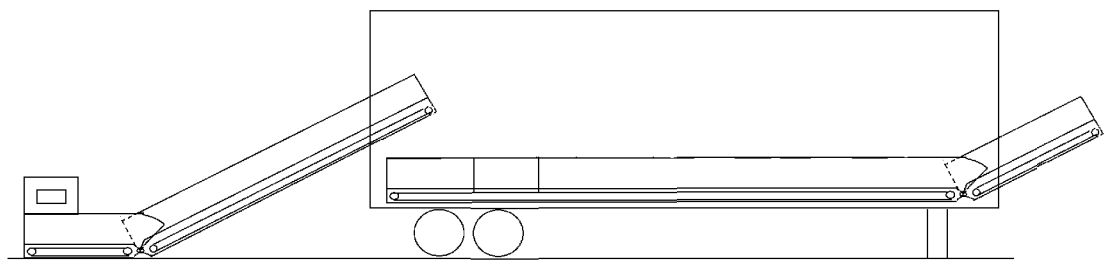

FIG. 17C illustrates an end of the first transfer unit 3000' being lowered to the ground and an end of the fourth transfer unit 6000 being elevated. Once assembled, articles, for example, hens, may be fed through the apertures 3150' of the second transfer unit 3000' where they are transferred along the second transfer unit 3000' to an opening 4050 of the gas chamber 4000 where they are moved by a moving unit through the first, second, and third chambers 4100, 4200, and 4300 of the gas chamber 4000 and to the fourth transfer unit 6000 where the euthanized poultry are fed to a finishing unit 7000 which may be a grinder. In example embodiments, the finishing unit 7000 may itself be loaded into and transported by another trailer. Thus, the finishing unit 7000, along with system 10000', may be mobile.

Figure 18:
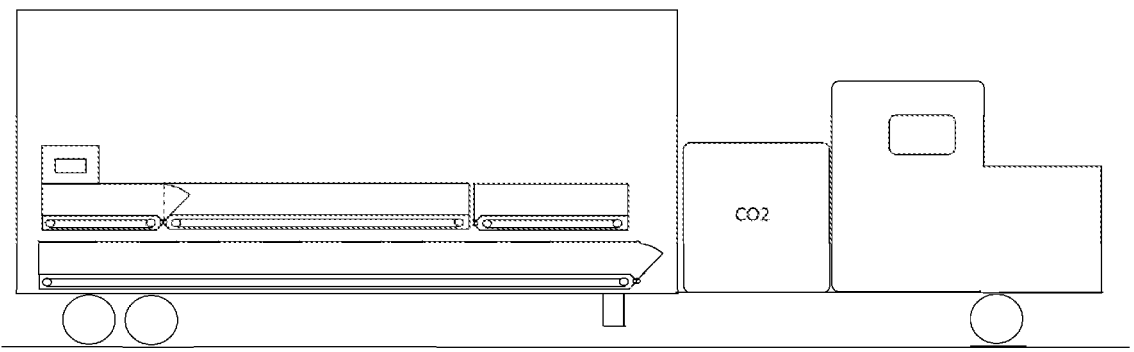
FIG. 18 is a view of a system in a trailer and a CO2 tank in accordance with example embodiments.

In example embodiments, a relatively large tank containing carbon dioxide may be transported along with the elements of the system 10000 as shown in FIG. 18. Thus, example embodiments provide for a mobile euthanizing device which may be used to euthanize a plurality of poultry.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A cart configured to transport articles, the cart comprising:

a plurality of compartments, wherein each compartment includes a moving device configured to move an animal from a loading end of the compartment to an unloading end of the compartment, each moving device including a belt wrapped around a first roller and a second roller, wherein the first roller is configured to rotate under the influence of a handheld driving device.

2. The cart of claim 1, wherein at the first roller includes an interfacing structure configured to interface with the driving device.

3. The cart of claim 2, wherein the interfacing structure is one of male and female structure.

4. The cart of claim 1, wherein loading ends of the compartments include hinged loading doors configured to swing into their respective compartments and unloading ends of the compartments include unloading doors configured to swing out of their respective compartments.

5. The cart of claim 4, wherein the loading doors are comprised of a wire mesh.

6. The cart of claim 4, wherein the unloading doors are comprised of plates.

7. The cart of claim 4, wherein the unloading doors are operatively connected to handles arranged on an outside of their respective compartments.

8. The cart of claim 4, wherein the unloading doors are configured to rotate between a pair of retaining bars.

9. The cart of claim 1, further comprising:

a pair of castor wheels arranged near the loading end of the cart.

10. The cart of claim 1, wherein each compartment encloses a substantially rectangular area having a long direction along which the animals are moved by the moving devices.

* * * * *